US008749382B2

(12) United States Patent
Sterzinger et al.

(10) Patent No.: US 8,749,382 B2
(45) Date of Patent: Jun. 10, 2014

(54) PORTABLE SECURITY CONTAINER

(75) Inventors: Hermann Sterzinger, Baldham (DE); Peter Leicher, Munich (DE); Richard G. Hyatt, Shawsville, VA (US)

(73) Assignee: Myspace LLC, Blacksburg, VA (US)

( * ) Notice: Subject to any disclaimer, the term of this patent is extended or adjusted under 35 U.S.C. 154(b) by 218 days.

(21) Appl. No.: 12/848,724

(22) Filed: Aug. 2, 2010

(65) Prior Publication Data

US 2011/0187530 A1 Aug. 4, 2011

Related U.S. Application Data

(63) Continuation of application No. 10/524,416, filed as application No. PCT/EP03/08937 on Aug. 12, 2003, now abandoned.

(30) Foreign Application Priority Data

Aug. 13, 2002 (EP) .................................. 020108080

(51) Int. Cl.
*G06F 7/04* (2006.01)

(52) U.S. Cl.
USPC .......................................................... 340/541

(58) Field of Classification Search
CPC .... G08B 13/122; G08B 25/008; G08B 13/19; G06K 7/0008; G06K 19/0723; G06K 19/07749
USPC ........ 340/5.73, 3.1, 5.1, 5.2, 5.51, 5.52, 5.53, 340/5.54, 5.7, 5.8, 5.81, 5.82, 541
See application file for complete search history.

(56) References Cited

U.S. PATENT DOCUMENTS 4,119,815 A * 10/1978 Frankfort et al. ........ 379/216.01
5,321,242 A * 6/1994 Heath, Jr. ...................... 235/382
5,416,472 A * 5/1995 Torii, Jr. ....................... 340/5.33
(Continued)

FOREIGN PATENT DOCUMENTS

JP 06085912 * 3/1994

*Primary Examiner* — Jennifer Mehmood
*Assistant Examiner* — Yong Hang Jiang
(74) *Attorney, Agent, or Firm* — Baker & Hostetler LLP

(57) ABSTRACT

A process and security container that enable local protection and remote transportation of items found with the environment of a contemporary office, while generating a log of users who have gained access to the container. e container may be constructed with one or more sidewalls bearing a removable lid. The container may have a closed interior while the lid is in complete engagement with the sidewalls, and have an open interior able to removably receive items within the interior while the lid is dislodged from its complete engagement. A port is exposed through one of said sidewalls to receive data signals and a control stage with a non-volatile a memory, is mounted within the container and operationally coupled to a host computer to provide communication with the interior of the container via the port. A microprocessor based host computer sited externally to the container, has a keyboard initiating formation of the data signals and a monitor driven by the host computer to visually display video images. The host computer is operationally coupled to the port to participate in the communication by generating the data signals. The controller may generate a control signal and allow access to the interior of the container in response to occurrence of a coincidence between a data key received From the host computer among the data signals via the port and a data sequence obtained by the control stage in dependence upon information stored within the memory.

34 Claims, 25 Drawing Sheets

(56) References Cited

U.S. PATENT DOCUMENTS

| | | | | |
|---|---|---|---|---|
| 5,475,378 | A * | 12/1995 | Kaarsoo et al. | 340/5.6 |
| 5,615,625 | A * | 4/1997 | Cassidy et al. | 109/45 |
| 5,736,932 | A * | 4/1998 | Bulfer et al. | 340/5.74 |
| 5,835,861 | A * | 11/1998 | Whiteside | 455/466 |
| 5,907,286 | A * | 5/1999 | Kuma | 340/5.5 |
| 6,040,771 | A * | 3/2000 | Kim | 340/545.1 |
| 6,583,713 | B1 * | 6/2003 | Bates | 340/5.21 |
| 6,806,807 | B2 * | 10/2004 | Cayne et al. | 340/5.52 |
| 6,850,149 | B2 * | 2/2005 | Park | 340/7.1 |
| 7,212,098 | B1 * | 5/2007 | Trent et al. | 340/5.3 |
| 2002/0091537 | A1 * | 7/2002 | Algazi | 705/1 |
| 2002/0153994 | A1 * | 10/2002 | Bonner et al. | 340/5.21 |
| 2003/0104866 | A1 * | 6/2003 | Campo et al. | 463/42 |

* cited by examiner

| General Method of Operation | Authentication data Type | | | | | | | | | | | | | | | Data transmission method | | | | | | | |
|---|---|---|---|---|---|---|---|---|---|---|---|---|---|---|---|---|---|---|---|---|---|---|---|
| **Functions** | Origin location by GPS | Intermediate destination(s) by GPS | Final destination by GPS | Origin by data known by user | Intermediate destination(s) by data known by user | Final destination by data known by user at destination | Origin by data possessed by user | Intermediate destination(s) by data possessed by user | Final destination by data possessed by user at destination | Origin by unique data characteristic of the graphic input device | Intermediate locations by unique data characteristic of the graphic input device | Final destination by unique data characteristic of the graphic input device | Origin by personal characteristics of the user | Intermediate destination(s) by personal characteristics of the user | Final destination by personal characteristics of the user at destination | Data provided verbally | Data transmitted by e-mail or e-mail attachment | Data transferred across WLAN | Data transferred across LAN | Data transferred across internet | Data transferred across RF network -- wireless - | Storage and transport in container circuit memory | Data transferred by public telephone network |
| Opening | | | | | | | | | | | | | | | | | | | | | | | |
| Locking | | | | | | | | | | | | | | | | | | | | | | | |
| Locking open | | | | | | | | | | | | | | | | | | | | | | | |
| Programming features | | | | | | | | | | | | | | | | | | | | | | | |
| Retrieving event history | | | | | | | | | | | | | | | | | | | | | | | |
| Release from enclosure attached to anchoring point | | | | | | | | | | | | | | | | | | | | | | | |
| **Time of authentication data transmission** | | | | | | | | | | | | | | | | | | | | | | | |
| Prior to shipment | | | | | | | | | | | | | | | | | | | | | | | |
| In transit | | | | | | | | | | | | | | | | | | | | | | | |
| Upon arrival | | | | | | | | | | | | | | | | | | | | | | | |
| Upon connection to originating computer | | | | | | | | | | | | | | | | | | | | | | | |
| Upon connection to a host server processing authentication data | | | | | | | | | | | | | | | | | | | | | | | |
| One part of authentication data | | | | | | | | | | | | | | | | | | | | | | | |
| Complete authentication data | | | | | | | | | | | | | | | | | | | | | | | |

Fig. 25

PORTABLE SECURITY CONTAINER

CROSS-REFERENCE TO RELATED APPLICATIONS

This application is a Continuation of U.S. patent application Ser. No. 10/524,416, filed on Jan. 9, 2006, which is a National Stage of International Patent Application No. PCT/EP03/08937, filed on Aug. 12, 2003, which claims priority to Foreign Patent Application No. EP 02018080.8, filed on Aug. 13, 2002, the disclosures of which are incorporated herein by reference in their entirety.

BACKGROUND OF THE INVENTION

1. Field of the Invention

The present invention relates to processes and containers for controlling access to valuable items and, more particularly, to processes and systems for managing the security, access, use, siting and transportation of containers.

2. Background Art

In general, the need for protection and storage of valuables, sensitive information and controlled substances has increased over the past decade, particularly with the introduction of new forms of valuable tangible property such as the higher density optical and magnetic storage media. Contemporary offices rely upon one or more security devices such as mechanical locks placed upon cabinets, safes, doors and buildings to provide physical security for the interior of the office as well as the contents distributed throughout the office during normal working hours. We have noticed however, that these approaches to office security do not provide any audit information about either the use of the security devices or about the personnel who use the devices. The need to control access as well as to provide an accurate record of personnel having access and the time of their access requires both physical and electronic security measures. In an office environment for example, items such as confidential papers, diskettes, engineering documents, and intrinsically valuable materials (such as, by way of example, gold electrical contacts) other tangible items are most conveniently left exposed upon a counter, in an insecure state, during normal working hours. Although these items may be stored in cabinets or desk drawers after hours, the degree of the security provided is poor. Office fixtures are typically only secure temporarily and, in most cases, unauthorized access cannot be detected.

Efforts such as the Electronic Interlock For Storage. Assembles of E. O. Warren, U.S. Pat. No. 5,22S,825, and the Locker Unit Comprising A Plurality Of Lockers of K. Kletzmaier, et al., U.S. Pat. No. 5,219,386 are examples of recent efforts in the art to electronically control access, albeit pay access to stationary objects such as doors and safes, and to provide both physical security and audit information about the use of the security devices. Although some electronic access control systems do endeavor to provide access control and audit capabilities, others such as the Portable Authentication System of L. C. Puhl, et al., U.S. Pat. No. 5,131,038; the Electronic Lock And Key System of F. Rode, et al., U.S. Pat. No. 4,727,369, the Fast Access Electronic Locking System of J. C. Spitzer, U.S. Pat. No. 5,299,436; and the Portable Electronic Access Controlled System For parting Meters Or The Like of Paul Benezet, U.S. Pat. No. 5,278,395 do not consistently, inexpensively and reliably address the need for transportation of assets between remote locations in a secure manner. We have found that the unauthorized and undetected access to sensitive information or materials during transit, or during storage, is a concern that has not previously been adequately addressed by the art.

SUMMARY OF THE INVENTION

It is therefore an object of the present invention to provide an improved security process and container.

It is another object to provide a simplified security process and portable container that conforms to contemporary business office practice by securing valuable items for both storage and transportation to remote locations.

It is yet another object to provide a security process and portable container that is readily and repeatedly usable to quickly receive, store and transport valuable items, while providing a log of the users who gain access to the container.

It is still another object to provide a process and portable container to enhance the security of contemporary offices.

It is still yet another object to provide a process and security container that readily conforms to habits and customs common to a contemporary business office while enabling local protection and remote transportation of items found within the environment of the contemporary office.

It is a further object to provide a process and security container that readily conforms to habits and customs common to a broad spectrum of contemporary business offices while generating a log of users who have gained access to the container.

It is also an object to provide processes and systems for easily and reliably managing the security, access, use, siting and transportation of containers.

These and other objects may be attained with a process that uses a data key to control access to a portable container. The container may be constructed with a housing having one or more walls supporting either a removable lid, or other panel providing access to the interior of the container. The container has a closed interior while that panel is in engagement with one or more walls of the housing, and an open interior able to removably receive items while the panel is dislodged from its engagement with the housing. A port is accessible through one or more of the walls of the container to receive data signals, and a control stage incorporating a non volatile memory is operationally coupled to provide communication with the interior of the container via the port. The controller generates a control signal in response to the occurrence of a coincidence between a data key received via the port and a data sequence obtained by the control stage in dependence upon information stored within the memory. An electromechanical moving element is positioned to engage the lid and hinder removal of the lid from its engagement, and to respond to the control signal by releasing the lid from its engagement to allow access to the interior of the container. A host computer sited externally to the container, communicates with the controller via the port, and drives the container as a peripheral device. In response to a request for access entered via an input device such as a keyboard coupled to the host computer and transmitted by one, or more, of the ports provided by the container, the controller makes a determination of whether to grant the access requested by generating a control signal that allows the moving element lock to release the access panel on the basis of, inter alia, the disposition of the port relative to a source of the data signals, on the basis of the disposition of the container within a scheme for generation of the data signals, and in response to occurrence of a coincidence between a data key received by the controller among the data signals via the port and a data sequence obtained by the controller in dependence upon the information stored within the memory. In addition to the coincidence between the data key and memory, the physical location of the container, via GPS or other determining factors may factor in to the determination of whether to grant access. These and other objects may also be attained with the control stage being operationally coupled to provide communication with the interior of the container via the port, and generate an alarm signal in response to an unauthorized interruption of the communication via the port. An alarm is driven by the controller to broadcast an indication of the unauthorized interruption in response to the alarm signal. The alarm may be located either within the container or driven directly by a host computer that is external to the container and that absent the interruption, communicates with the controller via the port.

It is also an object to provide processes and systems for easily and reliably docking the container and electromechanically fixing or releasing it from its docking location, with or without providing access to the interior of the container in dependence on data signals.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 25 is a diagram showing various methods of the operation of the invention.

DETAILED DESCRIPTION OF THE INVENTION

Figure 1:
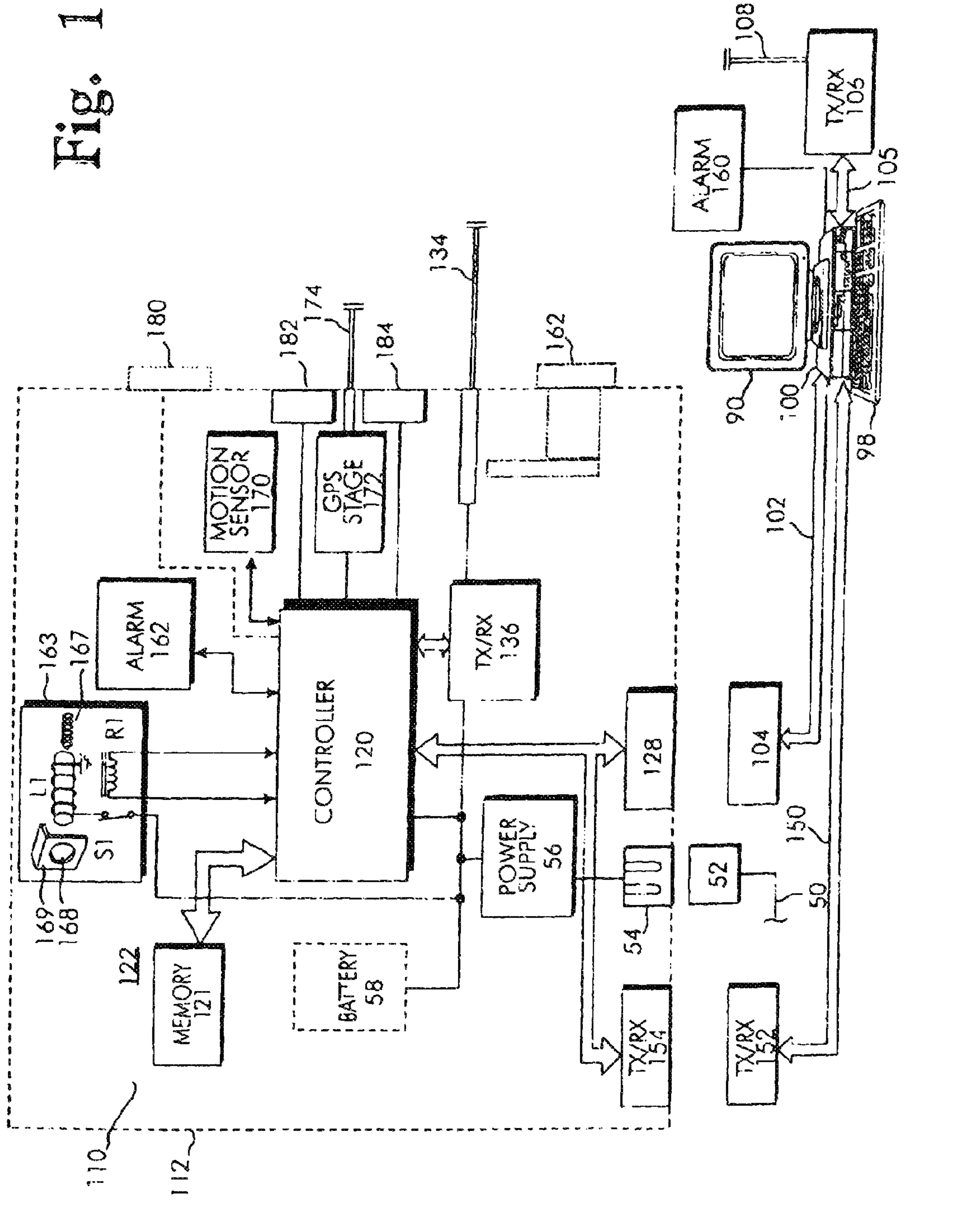
FIG. 1 is a block diagram of one embodiment of a container management system that may be constructed in accordance with the principles of the present invention.
Figure 2:
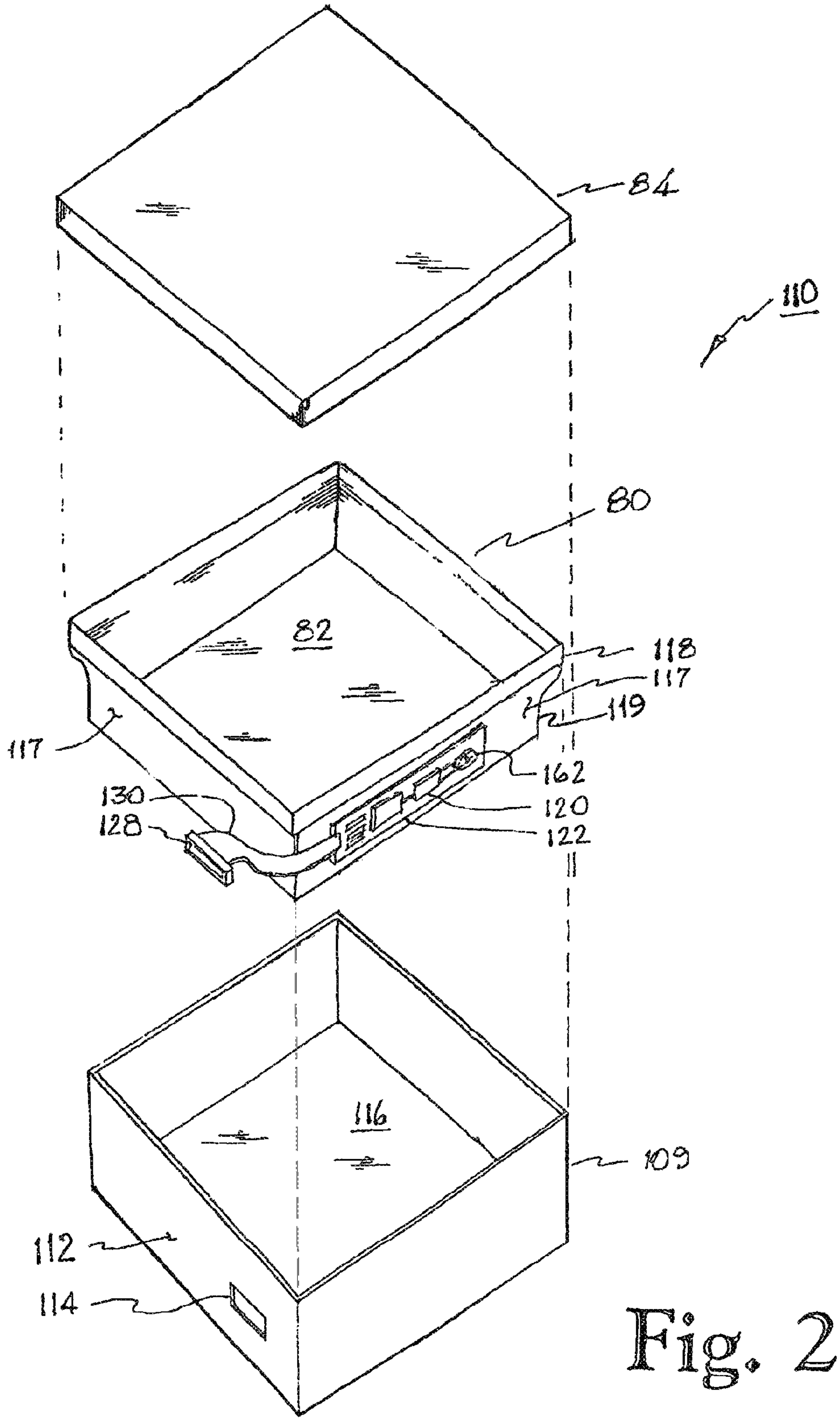
FIG. 2 is a perspective view of a portable container that may be constructed in accordance with the principles of the present invention.

Turing now to the drawings, FIGS. 1 and 2 illustrate one embodiment of a container management system that may be constructed in accordance with the principles of the present invention, with a host computer 100 driving a video monitor 90 to display varying visual images and symbols, and a keyboard 98 that enables a user to manually enter information and commands into computer 100. A data cable 102 such as a serial cable, a parallel multi-lead cable, a small computer system interface (i.e., a SCSI) cable, a universal serial bus (i.e., a USB) cable, or one or more optical fibers, is coupled at one end into a conforming socket operationally connected to the motherboard of computer 100, and terminated at the opposite end by a plug 104 that may be removably inserted into a socket 128 that is operationally coupled, by for example, a ribbon cable 130 that provides a data bus, to a microprocessor based controller 120. Information received by the controller from host computer 100 may be written into and read from a non-volatile memory 121 that is addressed by controller 120. Alternately, Infrared port 152 may be driven by the motherboard of computer 100 to send data to and receive data from infrared port 154 which is controlled by controller 120. In certain embodiments RF device 106 may send data via antenna 108 to RF device 136 via antenna 134. Device 106 and 136 may send or receive data as they are transceivers.

A motion sensor 170 may be mounted either upon circuit board 122, or within container 110, to provide motion signals to controller 120 whenever sensor 170 detects movement of container 110. Sensor 170 may be implemented with a spring loaded switch designed to provide motion signals that exhibit one logic state when container 110 is stationary upon a desktop, for example, with the juxtaposition of the container and the desktop holding the actuator of the switch depressed, and a second and different logic state when container 110 is lifted above the desktop and the actuator of the switch is released. Alternatively, motion sensor 170 may detect changes in inertia and provide a motion signal to controller 120 whenever container 110 is in motion.

A location sensor such as, by way of example, a global position satellite receiver stage 172 and its antenna 174 mounted to extend externally to container 110, may be periodically polled by controller 120 to furnish a relatively accurate indication of the geographic location of container 110. Controller 120 may be programmed to refuse to deny access to container 110, by way of example, refusing to release an electro-mechanical latch whenever receiver stage 172 fails to indicate that container 110 is located at an assigned location.

As illustrated in FIG. 2, the portable container 110 may be constructed with one or more sidewalls 112 forming an outer casement 109 closed at one end by a continuous bottom surface 116. An inner casement 118 for container 80 may be constructed with one or more sidewalls 84 jointed together and closed at one end by a continuous bottom surface 82. The upper rim 86 of container 110 may be extended outward to engage the inner surfaces 88 and sidewalls 112, thereby providing a cavity 19 between the spaced apart sidewalls 84 and inner surfaces 88 that may be used to accommodate a circuit board 122, lead cable 130 and socket 128. An aperture 114 formed on one of the sidewalls 112 exposes socket 128 to an environment external to a container 110. A lid, or other panel 84 encloses both the inner and outer containers, once inner container 118 has been inserted between sidewalls 112 of outer container 70, and controls access to the interior of inner casement 80 and thus container 110. When panel 84 completely engages the sidewalls 112 of outer casement 109, access to the interior of container 110 may be utterly denied; when panel 84 is dislodged from this complete engagement however, full access may be permitted into the interior.

An electro-mechanical latch 163 operated by controller 120 may be mounted within container 110 to restrict removal of access panel 84, and thereby preserve the unrestricted access to the contents of container 110 while panel 84 remains undisturbed in its complete engagement of lower container whether the contact wiper of the switch S1 component of relay R1 is opened or closed, and whether electrical current is applied to solenoid L1. In the absence of electrical current trough solenoid L1, that is, when switch S1 is in its electrically open state, a spring 167 may be used to bias the armature 168 to extend axially outward along the central axis defined by the coil winding of solenoid L1, and engage the aperture 168 formed in a hasp 169 mounted on the underside of panel 84. When controller 120 directs relay R1 to close switch S1 and apply an electrical current to the winding of solenoid L1, the armature of solenoid L1 is withdraw from aperture 168, as is shown in FIG. 1, to release hasp 169 and allow removal of panel 84. Optionally, in mechanical lock 162 such as a cylinder lock rotatably operated with a bitted key, may be mounted on the outer casement 70 at a location enabling lock 162 to engage lid 84 and thereby provide an additional degree of security when lock 162 is turned into its locked position. It should be noted that although circuit board 122 is mounted upon one of the several sidewalls 84 of the inner casement 80, it is also feasible to mount circuit board 122 beneath floor 82, and between outer floor 116 and inner floor 82, or, alternatively, to distribute the components mounted upon circuit board 122 into various distinct and different locations within the container, and even upon an underside of access panel 84.

Nominally, circuit board 122 may be powered directly by a power cord 50 with a jack 52 received within a socket 54 mounted upon circuit board 122. A power supply 56 coupled to socket 54, may be used to rectify, filter, attenuate and distribute electrical power to rechargeable battery 58 mounted upon circuit board 122, as well as to electromechanical latch 163, controller 120 and transceiver 136, alarm 162, motion sensor 170 and location sensor 172, among other elements supported by circuit board 122.

Turning now to FIGS. 3 through 8, communication between host computer 100 and controller 120, or alternatively, a local computer 100 or a computer 101 sited at a remote location to which container 110 has been transported, may be conducted in various modalities, depending upon which aperture within container 110 is serving as a port (e.g., an industry standard personal computer socket 128 (e.g., a serial port socket, a parallel port socket, a SCSI I or SCSI II socket, or a universal serial bus socket), infrared transmitter and receiver unit 154, radio or microwave length antenna 134, or global positioning satellite antenna 174) to accommodate transmission of data signals between a host external to container 110, such as computer 100, 101, and the controller 120 encased within container 110. A multi-lead data cable 102 terminated by plug 104 may couple either a parallel port, a serial port, a small computer system interface port, or universal serial bus port of computer 100 to bus 130 and controllers 120 via socket 128. Alternatively, a data cable 150 coupled to an infrared transmitter 152 may communicate via line-of-site to infrared transmitter 154 that may be mounted in aperture 114, or within a different aperture, to receive communications from infrared transmitter 152. Preferably, an infrared transmitter and infrared receiver unit 152 would be used to communicate with an infrared transmitter and infrared receiver unit 154 coupled to controller 120 via data bus 150. Alternatively, computer 100 may drive radio frequency or microwave transmitter and receiver unit 106 via data cable 105, to propagate radio frequency or microwave signals via antenna 108. Portable container 110 may be fitted with antenna 134 to receive the radio frequency wave signals propagated from antenna 108, or alternatively, a microwave antenna to receive microwave signals. Antenna 134 may be coupled to controller 120 via transmitter and receiver unit 136. Consequently, and regardless of whether data cable 102 is simply a direct electrical or optical connection with an output port of computer 100, 101, or a category 5 local area network, the conduction of transmission of data signals via port 128 is dependent upon the disposition of container 110 relative to the source (e.g, personal computer 110, 101) of the data signals. By way of example, if container 110 is moved away from the neighborhood of data cable 102, the limited length of data cable 102 will ultimately cause jack 104 to unplug from socket 128, thereby interrupting the conduction of transmission of data signals via port 128. Assuming that infrared transmitter and receiver unit 154 is serving as the port however, movement of container 110 relative to host computer 100, 101 to a location that would remove the line-of-sight alignment between infrared units 152, 154 will cause an interruption in the conduction of transmission of data signals via port 154. Should antenna 134 serve as the port for communications between computer 100, 101 however, movement of container 110 relative to computer 100, 101 to a location where either intervening electrical conductors, attenuation of signal strength due to distance, or removal of antenna 134 from the field of antenna 108 will cause an interruption in the conduction of transmission of data signals via port 134.

The interruption of the conduction of transmission of data signals via the selected port, or ports, provided by container 110 may be used, together with one or more schemes for transmission of data signals (including transmission of a data key to authorize access to the interior of container 110), as well as the content of the data signals transmitted, to restrict and control access to the interior of container 110. If, for example, antenna 174 is serving as the port accommodating conduction of transmission of data signals, movement of container 110 to a geographic location outside of the authorized range of siting (e.g., assuming that the global positioning system has a range of .dagger-dbl. 30 feet, movement of container 110 to a location more than thirty feet from the location authorized by computer 100 will be readily discernable by controller 120 from the position signal provided by GPS stage 172) is a factor that may be used by controller 120, in conjunction with host computer 100, in a scheme to control access to the interior of container 110. Accordingly, in response to a request for access entered via keyboard 96 and transmitted by one, or more, of the ports 128, 134, 154, and 174 provided by container 110, controller makes a determination of whether to grant the access requested by generating a control signal that allows lock 162 to release the access panel 84 on the basis of, inter alia, the disposition of the port relative to a source of the data signals, on the basis of the disposition of the container within a scheme for generation of the data signals, and in response to occurrence of a coincidence between a data key received by controller 120 among the data signals via the port and a data sequence obtained by controller 120 in dependence upon the information stored within memory 121.

Interruption of communications between computer 100 and controller 120 mounted on, or within, container 110, regardless of whether the interruption of communication occurs by removal of plug 104 from socket 124, severance of data cable 102, movement of container 110 to prevent transmission of signals between infrared units 152, 154, or interference with or suppression of signals between antennas 108, 134, may be used to trigger either alarm unit 160 driven directly by computer 100, or alarm 162 mounted on, or within container 110 and driven directly by controller 120, or alternatively, by both alarm units 160, 162, to broadcast a sensible alarm indicating the interruption of communication.

Figure 7:
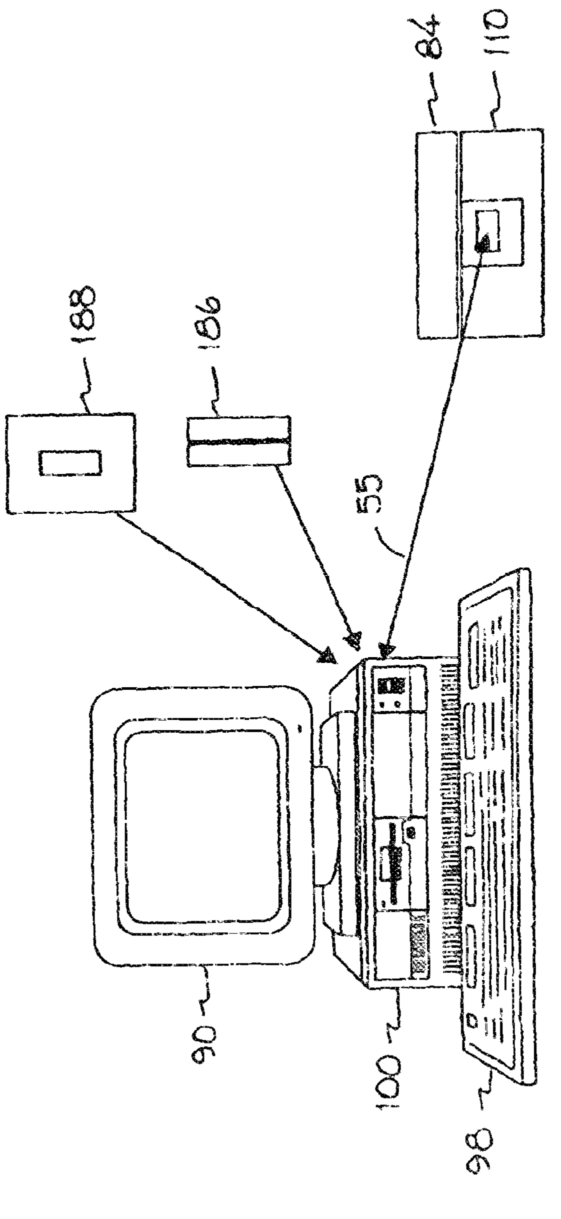
FIG. 7 illustrates an alternative implementation of the principles of the present invention with a host computer directly driving peripheral components that include a biometric scanner, a card reader and a portable container.

Although FIG. 1 shows container 110 fitted with separate data socket 128 and power socket 54, these sockets may be combined into a single socket 128 receiving both electrical power and either optical or electrical signals from plug 104. Additionally, container 110 may be fitted with a keypad or other manually operable switches 180 to enable container 110 to communicate with controller 120 independently of keyboard 98 and computer 100. This may be useful, for example, to power-up controller 120 or alternatively, to initiate a transmission from controller 120 to computer 100. Additionally, container 110 may be fitted with a visual or aural status indicator 182 such as a light-emitting diode that either flashes, is intermittently illuminated or is illuminated with different colors to indicate the status such as "no fault" or, no unauthorized movement or to indicate an unauthorized attempt to gain access to the contents of container 110. A touch memory port 184 may also be fitted into container 110 to enhance security, byway of example, to enable controller 120 to obtain a thumb print or a finger print from a prospective user and compare the print obtained via touch memory port 184 with a print of the prospective user that is stored in memory 124. Additionally, and as illustrated in FIG. 7, either or both host computer 100, or the computer 101 sited at the designation of container 110 may be operationally coupled to maintain communications with portable container 110 via line-of-sight infrared transmissions 55. A biometric scanner 188 may be connected to computer 100 as a peripheral unit to provide an enhanced degree of security, particularly when used together with a magnetic or optical strip cardreader 186. Together, biometric scanner 188, card reader 186 and keyboard 98 allow the input of the three items of security information from each prospective user of container 110 essential to a rigid security scheme, namely who the prospective user is (e.g., via biometric scanner 188), what the prospective user has possession of (e.g., namely an access card bearing a magnetic or optical strip confirming the authorization of the bearer to obtain access to the interior of container 110), and what the prospective user knows (e.g., a data key known to the prospective user that may be entered via keyboard 98). Authentication of these items of information by computer 100, 101, enables the computer to communicate with controller 120 borne by container 110 and authorize controller 120 to allow the user to gain access to the interior of container 110, as, for example, by energizing solenoid L1 to release access panel 84. Alternately, computer 100 may act only as an input output device which communicates a form of data containing all or part of the attributes of the user, data in possession of the user and data known to the user directly to controller 120.

Figure 8:
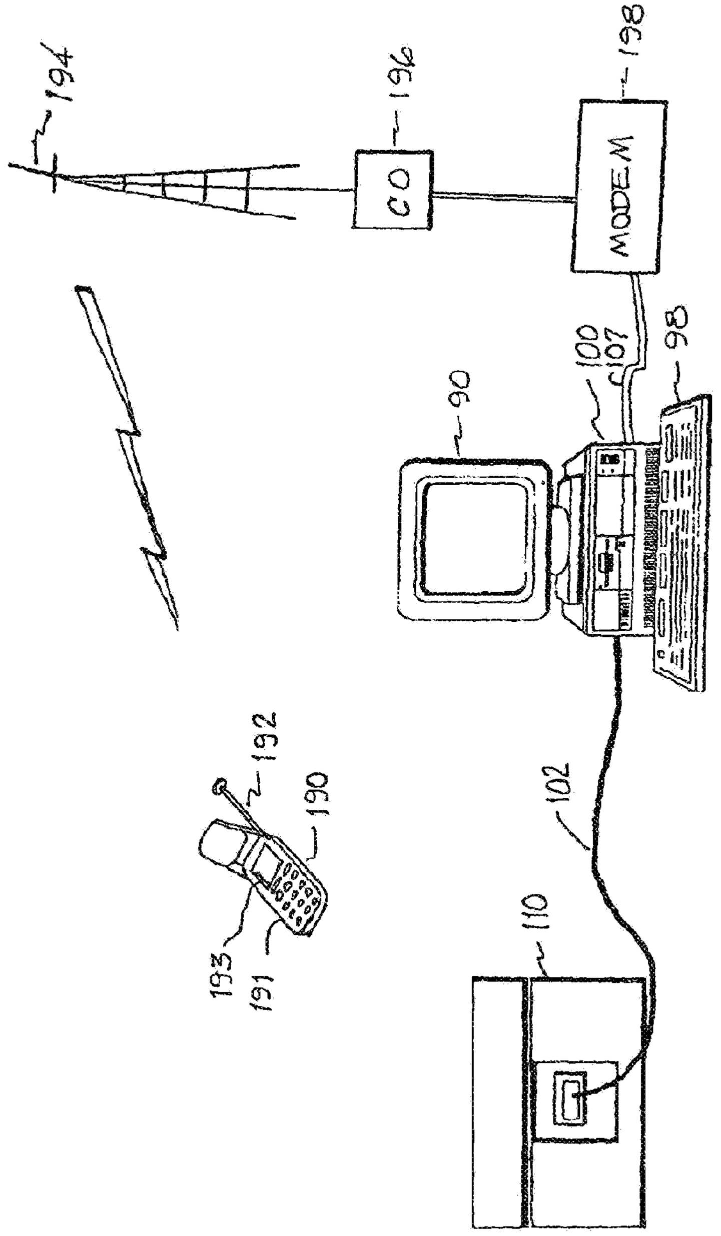
FIG. 8 illustrates an alternative implementation with a cellular telephone controlling access to a portable container.

FIG. 8 illustrates an alternative implementation with a telephone, such as a handheld portable cellular telephone handset 190 that is in communication via its antenna 192 with a central office (CO) 196 via a cellular tower antenna 194. Host computer 100 may either have an internal modem or be operationally coupled with lead 104 to an external modem 198, that is in turn coupled as a subscriber of the central office 196. Alternately, the modem 198, computer 100 may be self-contained in TX/RX device connected to controller 120 in the form of a self-contained cellular engine capable of communication with cell phone 190 via antenna 194 and central office 196. This configuration enables the user of telephone 190 to control access to container 110 via host computer 100, even though the user and telephone 190 are located several miles away from the site of container 110. The multifunction keypad 191 of cellular telephone 190 serves the user as a substitute for keyboard 98, while the liquid crystal display screen 193 serves the user as a substitute for monitor 90, and permits the user to indirectly, and remotely enter information into controller 120 and to receive information from controller 120.

The system may be implemented with one or more portable containers 110, each having space for storage of valuables. Each portable container 110 has a locking mechanism 160 that is used to control access to the contents of the container. The locking mechanism 160 electro-mechanical in design and controlled by electronic circuitry mounted on circuit board 122 that is located inside the portable container. The portable container electronic circuitry will respond to a communications link with an outside control point through the use of a communications port on the container. Access to the contents of the container is controlled through a verification scheme communicated between a control point device, which may be a personal computer 100, 101, and the portable container 110.

Power for operation of the portable container electronic circuitry and electromechanical lock 160 will be normally supplied at the control point; however in one application, the power supply may be an auxiliary unit 58 that is contained within the container. Portable container 110 may be used in a stationary mode where the container is connected to a personal computer 100 for the purpose of communicating between the electronic logic circuits on circuit board 122 in the container locking mechanism and the software application used to control access to the container. The container 110 maybe left in the open and unlocked condition while being used frequently and closed and locked when access is not required. It may be desirable to place container 110 in a state where it remains unlocked, preventing unwanted use or to ensure items are not accidentally left inside when the container is not in use. The personal computer 100, 101 will have the ability through the hardware and software to detect the presence of the portable container and to determine its current state, that is, whether container 110 is open or whether container 110 is closed and operational its location as well as its contents are secure.

In order for access to be made into a closed and locked container, the user will be required to input contain personalized information into the personal computer 100, 101. The personal computer 100, 101 will verify this information and send the data signals including a data key necessary for the logic circuits of controller 120 mounted within container 110 to determine that a valid request to unlock had been received from an authorized individual controller 120 would then allow for the access requested by operating locking mechanism 163. One access per request from the personal computer may, in one embodiment, be allowed.

Circuit board 122 inside the portable container 110 will store audit trail information into its internal memory 121 for each access request and if desired each significant event related to the status of the container. This audit information is available to be extracted from memory 121 of the portable container 110 for future interrogation. The personal computer 100, 101 or other control point will also store audit information for each access request and associated activity in its ongoing historical database.

Figure 3:
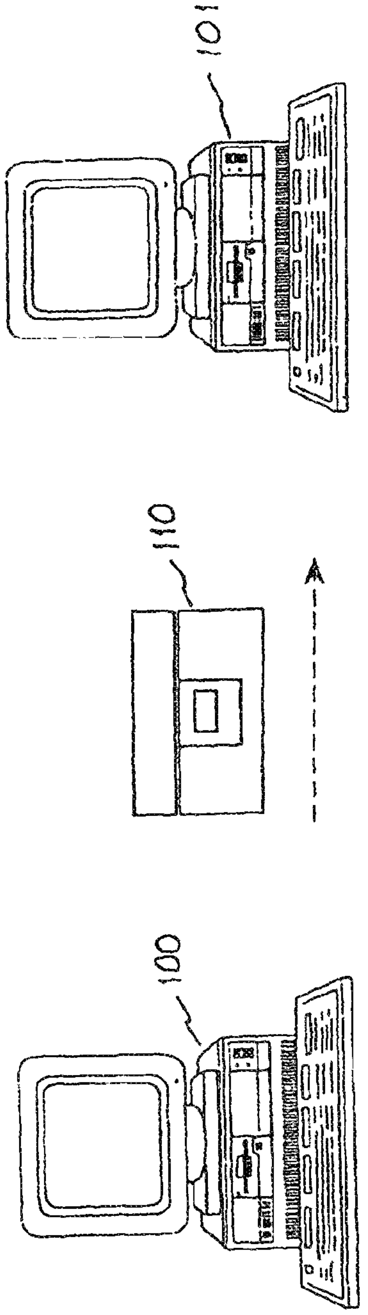
FIG. 3 illustrates the transport of a portable container between a host computer sited at an origin and a host computer sited at a destination.
Figure 4:
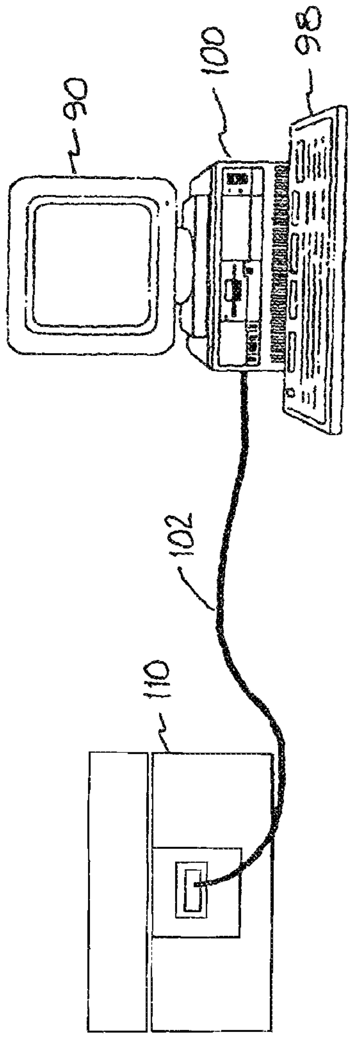
FIG. 4 illustrates a typical implementation of a host computer connected to a container during the practice of the principles of the present invention.
Figure 5:
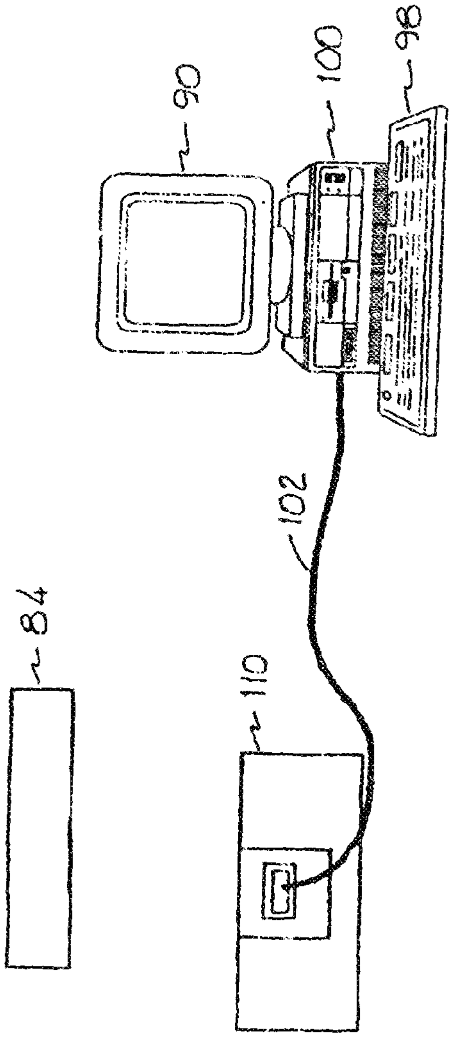
FIG. 5 illustrates the implementation of FIG. 4, with the access panel removed to provide access to the interior of the container.
Figure 6:
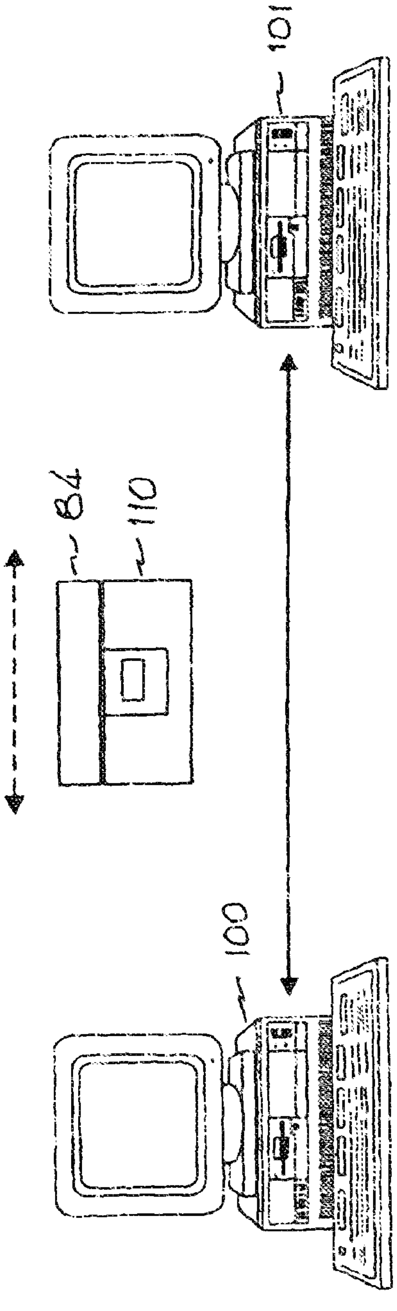
FIG. 6 illustrates the transport of a portable container between a host computer sited at an origin connected by a network to a host computer sited at a destination of the portable container.

As indicated by FIGS. 3 and 6, in the event it becomes necessary for container 110 to be transported to a different location, the container can be locked securely and transported. The contents of the portable container will be kept secure during the transportation of the container. Upon arrival at the desired destination, the container could then communicate with a secondary control point such as a local personal computer 101 that has, or is given (by the originating personal computer or y the user) the necessary data required to communicate with the container for the purpose of gaining access to the interior of container 110.

The data key used to determine the validity of an access request may take the from form of a digital password that is written to the container control logic of circuit board 122, or may be information that is unique to, or o by the user transporting the container. The portable container authorization data may be transferred from the originating control point to the destination control point utilizing a network communications approach such as the Internet or by way of wireless communications.

It is also a feature of the portable container system to utilize biometric data in the authorization process. Biometric data can associate the individual users requesting access to data that was communicated to the locking mechanism control circuitry at the point of origination when the container was secured for transport. The memory 121 of controller 120 may store and transport the biometric data of the authorized user at the destination from the origin to the destination or it could store and transport the biometric data of users at the origin and destination.

Each portable container 110 may also be used in a roaming mode where authorization data is presented to the container control logic circuitry of controller 120 directly from the user. This information may be input trough an optional multikey keypad 180 that is a component of the container or through a communications device such as a portable Touch Memory™ credential as manufactured by Dallas Semiconductor or such as the multi-function keypad 191 of cell phone 190. This feature will allow the authorized user to have free access in locations remote from the origination control point.

Access to the portable containers in the system may be geographic (as represented by global positioning satellite signals), time and date dependent in addition to the user or control point verifications. Features such as dual control (requiring more than one user to be verified) and time delay (a wait period after verification before locking mechanism 163 in container 110 allows access) are available. Additional features, such as mechanical locks 162 may be combined with the electronic access control in container 110 to further enhance the overall security of the container system.

This advantageously enables one of the user's host computers 100 to communicate via data cable 102 directly with the controller 120 within portable container 110, or alternatively, to communicate via a network such as a local area network coupled to the port provided by socket 128. As a further alternative, host computer 100 may communicate via a radio frequency transmitter and receiver 106 that, in turn, can communicate via antenna 108 and an antenna 134 mounted in one of the sidewalls 112 of container 110, with a transmitter and receiver 136 connected to provide signals to controller 120. As an additional alternative, host computer 100 may communicate via data cable 150 with an infrared transmitter and receiver 152 that, in turn, can communicate via an infrared receiver and transmitter 154 mounted in one of the sidewalls 112, to controller 120.

The foregoing paragraphs describe details of a container management system that advantageously provides a portable lock with an authentication component that may be time, date, geographic and person dependent, and that is in most configurations, stationary. Biometric data of authorized users may be stored and carried by the lock. Access to the container may be attained trough use of personal keyboard in which the authentication may be based upon input from the computer keyboard, or any of several profile devices such as a retina (that is a part of eyeball) scan, face recognition, handwriting reader, voiceprint reader or a thumb print read by a scanner connected as a profile devices to the computer. This system provides a technique for sending authentication or authorization data to the remote destination of the portable container via either Internet or some other network communication, or for acquiring the authentication or authorization locally in dependence upon one or more of various possible combinations of geographic data such as signals received directly by controller 120 from global positioning satellite signals personal data such as retina, thumb print or other biometric template of the individual seeking access, and authorization data transmitted directly to or previously stored in a remote computer terminal 101.

Figure 9:
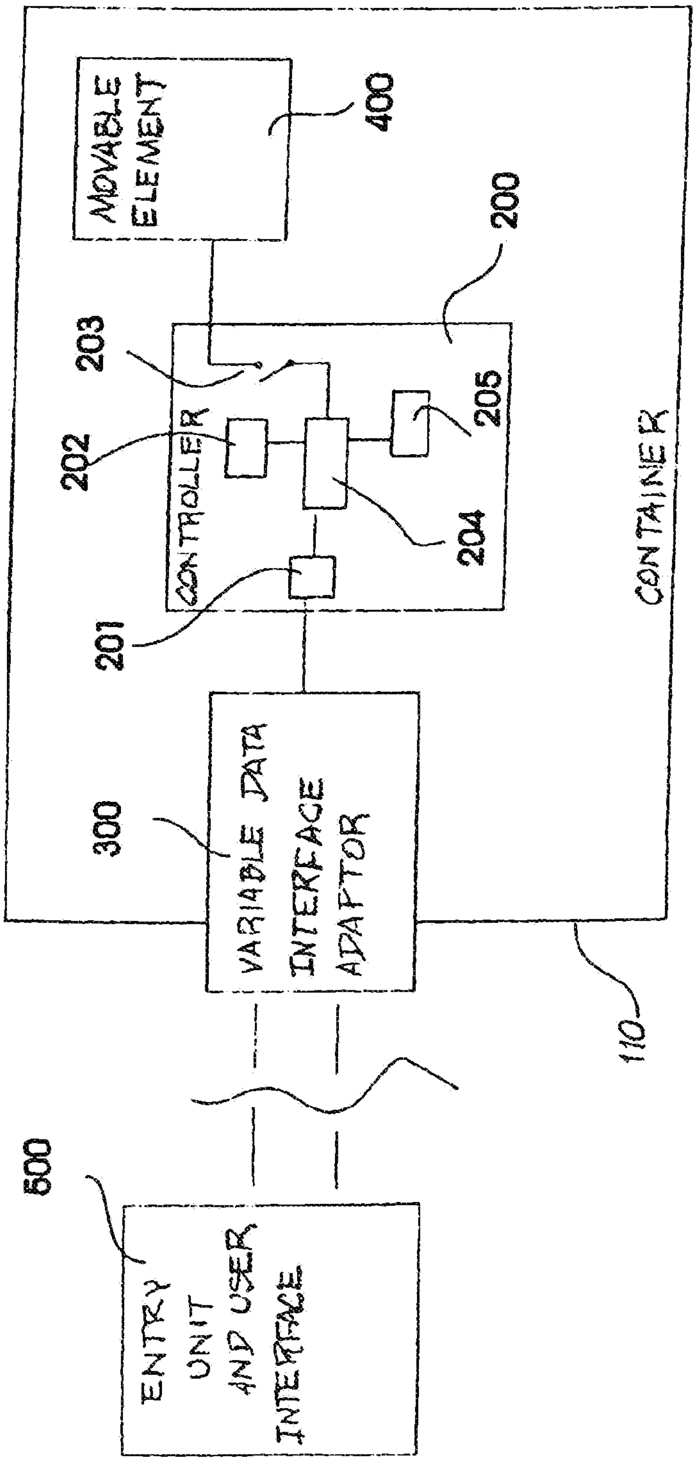
FIG. 9 is a schematic block diagram illustrating an alternative embodiment of the present invention.

Turning now to FIG. 9, a portable box 110 is able to store valuables for removal or access by either the same by a different user. Access to the contents of box 110 is effected by change of state of movable element 400 as a result of an action by the decision control point 200. Control point 200 is extended by variable data interface adapter 300 so that control point 200 may receive data from, or send data to a variety of entry units 500. A changeable variable data interface adapter 300 may be removed and replaced without affecting the code stored in memory 202 of controller 200. Both the hardware and software configurations of changeable variable data interface adapter 300 may allow different forms of entry units 500 to be used. Accordingly, entry of subsequent data may be transmitted through different forms of entry units 500 because adapter 300 is both removable and interchangeable with other adapters 300. Controller 200 includes an input/ output stage 201, an operational memory 202, output stage 203, driving movable element 400, microprocessor 204 and clock 205.

Storage container 110 allows storage of valuable contents and may allow, or deny access to the contents. Container 110 is portable, contains and safely transports controller 200, houses and also transports moving element 400, and contains, or partially contains, variable data interface, adapter 300. Controller 200 stores code data in memory 202 for comparison to data received by container 110 via adapter 300, while storing information for transmission via adapter 300, to describe the event history and provide and audit trail about the use and movement of container 110. In essence, controller 200 regulates access to the contents of box 110 by controlling moving element 400, and allows access on the basis of data delivered via adapter 300. Optionally, controller 200 may make an access decision on the basis of the status of peripheral components of adapter 300, and may optionally make access decisions based upon the status of clock 205.

Variable data interface adapter 300 may be replaced with a different type of adapter, without affecting the data code stored in memory 202. Additionally, adapter may be changed to allow added features that allow communication with preferred customers via interface 500. Interface 300 may be part of either a modem, a cellular transceiver, an alarm monitoring interface, a communication interface (such as an RS232, universal serial bus, infrared bi-directional receiver and transmitter, or radio frequency transceiver), or global positioning satellite receiver. Gap AG manufactures a line of transceivers that are marketed under the HiConnex and HiConnex Easy product line that may be incorporated into interface 300; additionally, the Siemens M20 and M20 terminals may also be used as the cellular engines of interface 300.

An additional possibility for circuit 200 is that it may be a single chip PC such as those manufactured by Beck, wherein the various other components such as memory, clock functions and I/O are integrated into a single package which functions as a PC and may use an operating system normally associated with Personal Computers.

Entry Unit and user interface 500 is always removable. In some embodiments, connection between adapter 300 and interface 500 may not require a physical connection. For example, infra-red bi-directional transmission, cellular transmission and radio frequency transmission and reception avoid the necessity of a cable extending between adapter 300 and interface 500. In particular embodiments, interface 500 may be implemented with one or more of a card reader, keypad, biometric scanning reader, modem, personal computer host, cellular telephone, handheld computer, personal computer network (either a local area or wide area network), an internet interface, a data entry device or a memory device. Multiple types of data entry interface units 500 may be used with the same container 110, depending upon configuration of adapter 300. Data entry unit 500 is not a permanent fixture of container 110 or controller 200. Entry unit 500 may deliver the status of container 110, as well as the location of the container to the user. Entry unit 500 may, in a particular embodiment, set the code data and criteria by which controller 200 acts on moving element 400. In the embodiment shown in FIG. 1, solenoid L1 maybe used as movable element 400, to either engage, or release, hasp 169. A motor, coil or other electrically responsive moving element could be substituted for solenoid L1.

Figure 10:
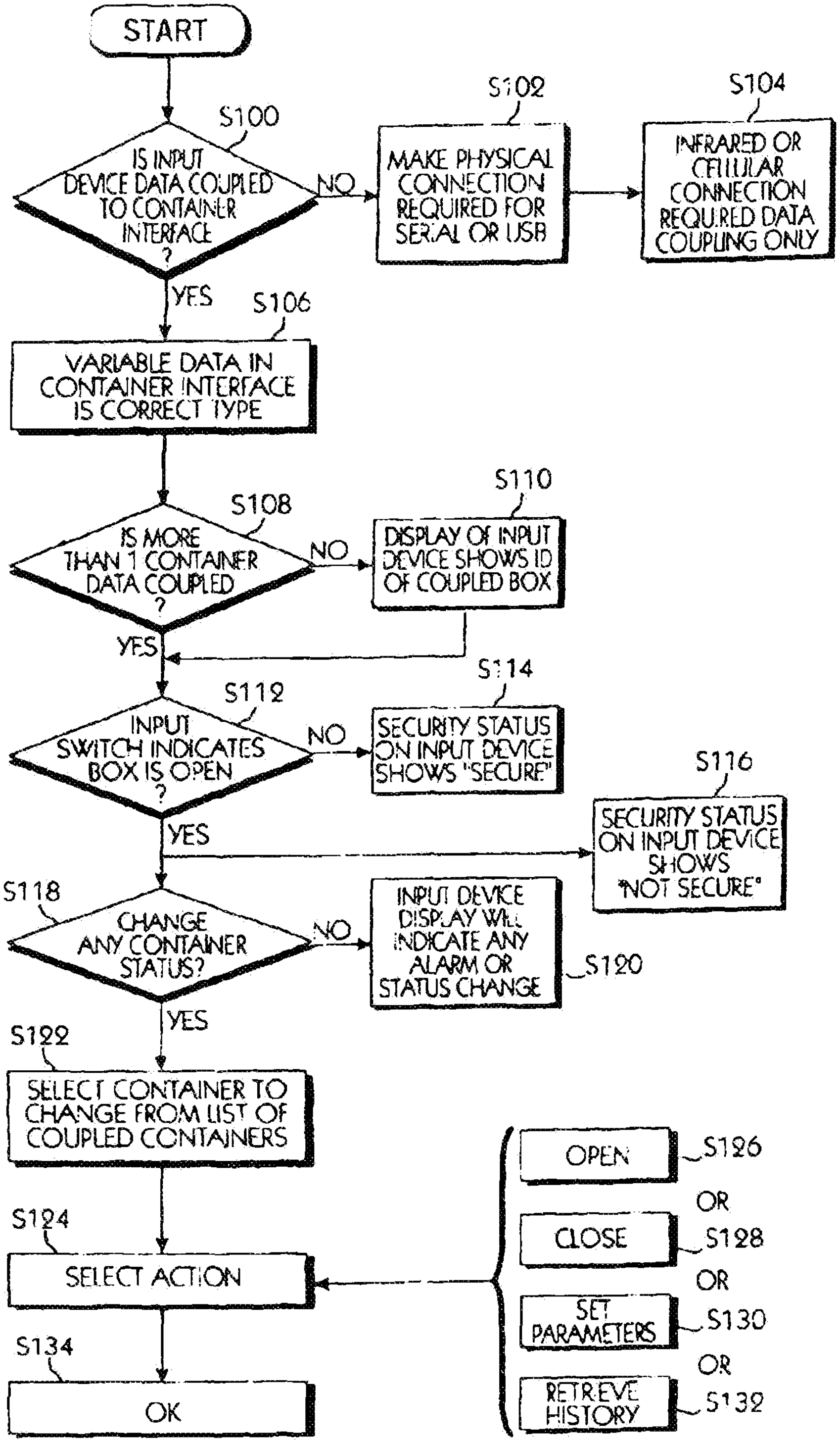
FIG. 10 is a flowchart that illustrates one mode of operation of an embodiment of the present invention.
Figure 11:
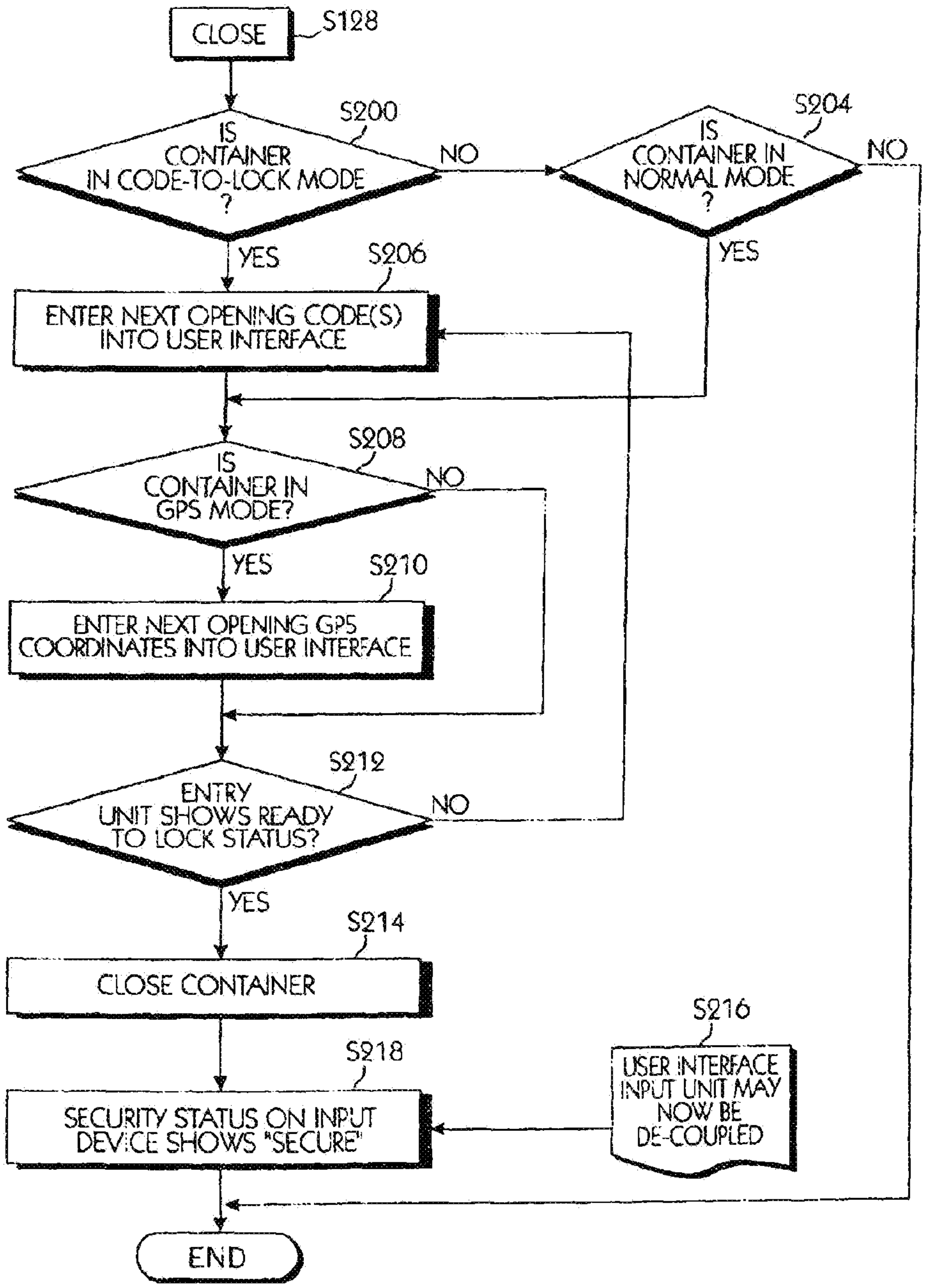
FIG. 11 is a flowchart that illustrates another mode of operation of an embodiment of the present invention.
Figure 12:
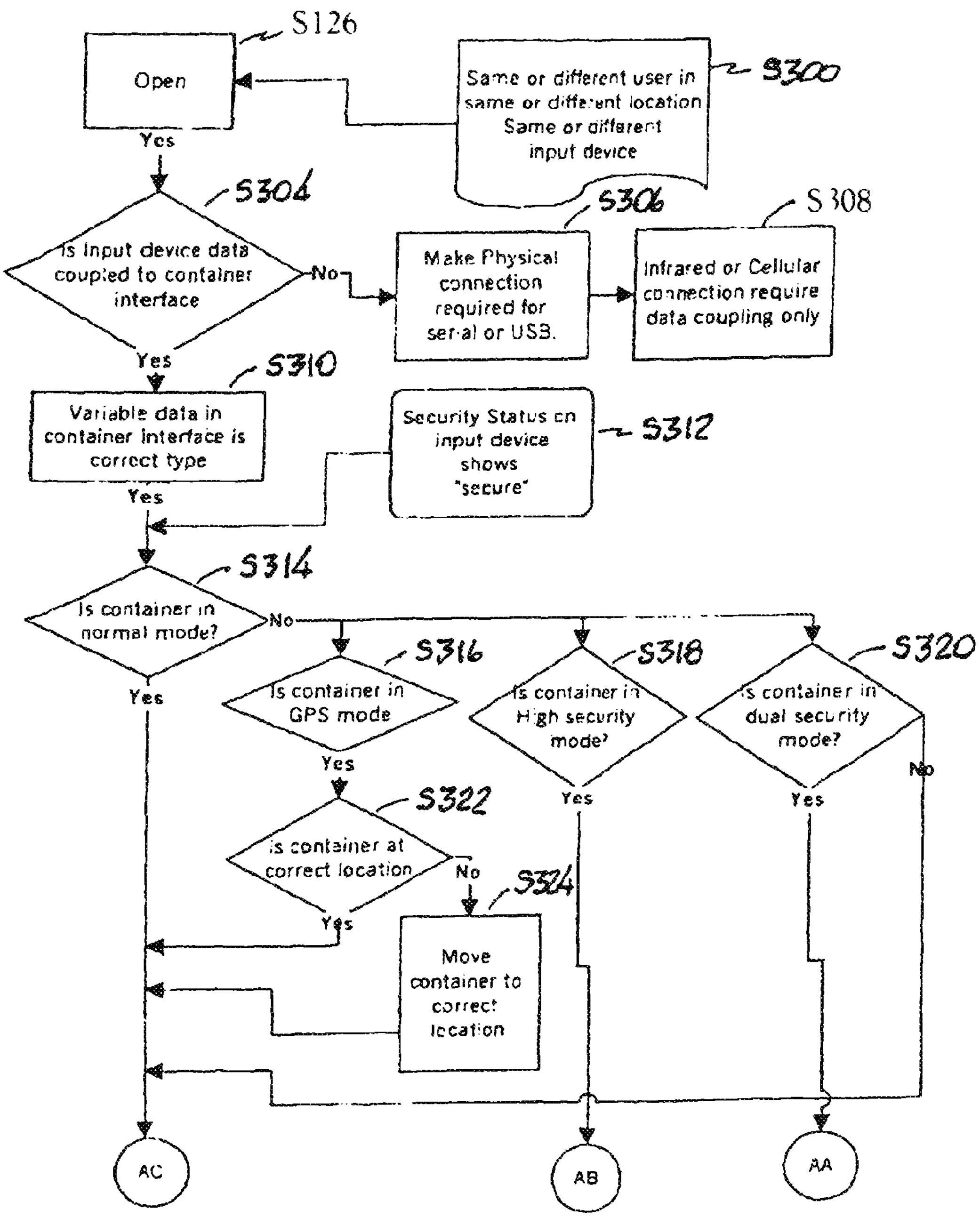
FIGS. 12 and 13 are flowcharts that illustrate the operation of an embodiment of the present invention while the container is in an open mode.
Figure 13:
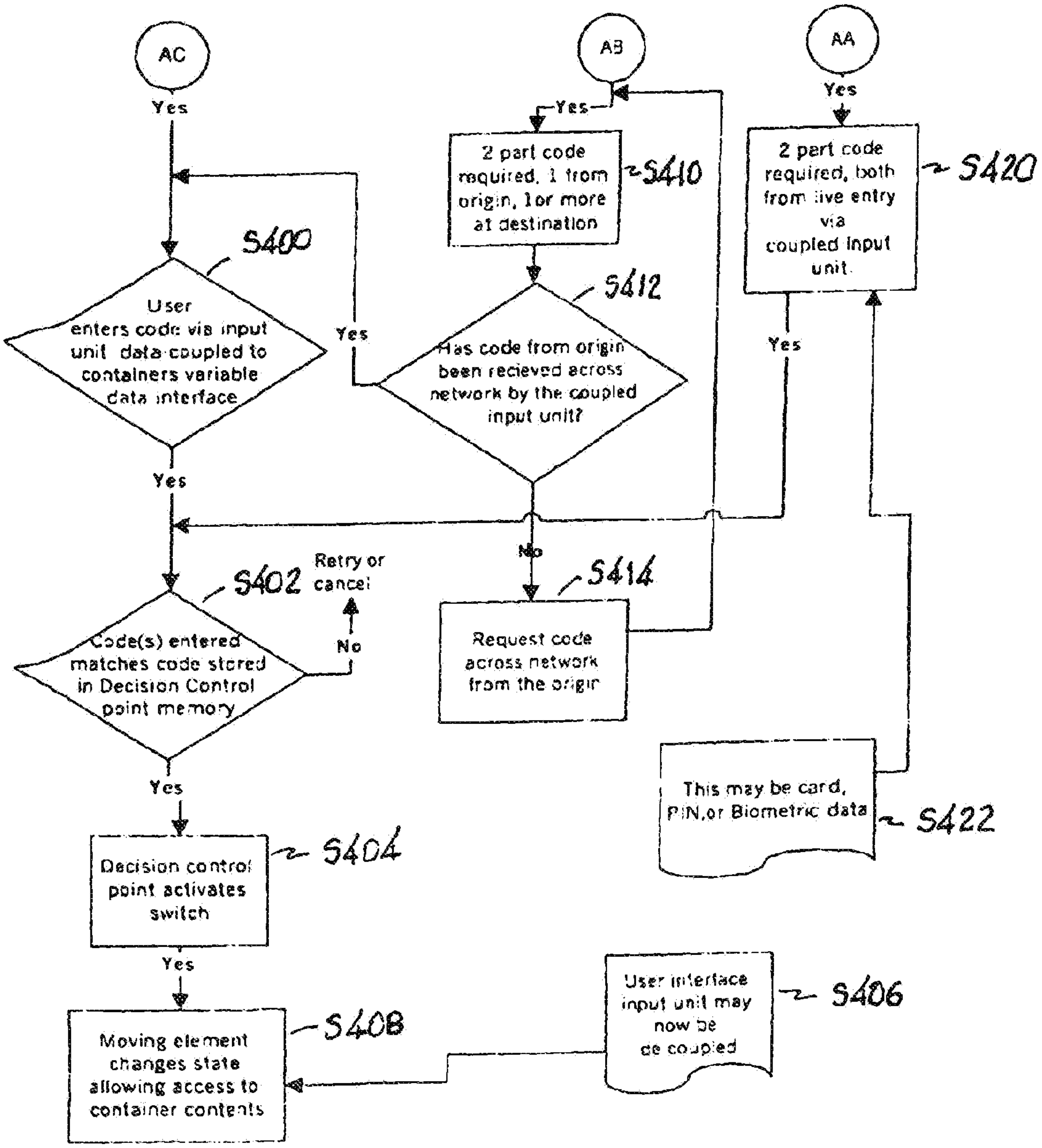
Figure 14:
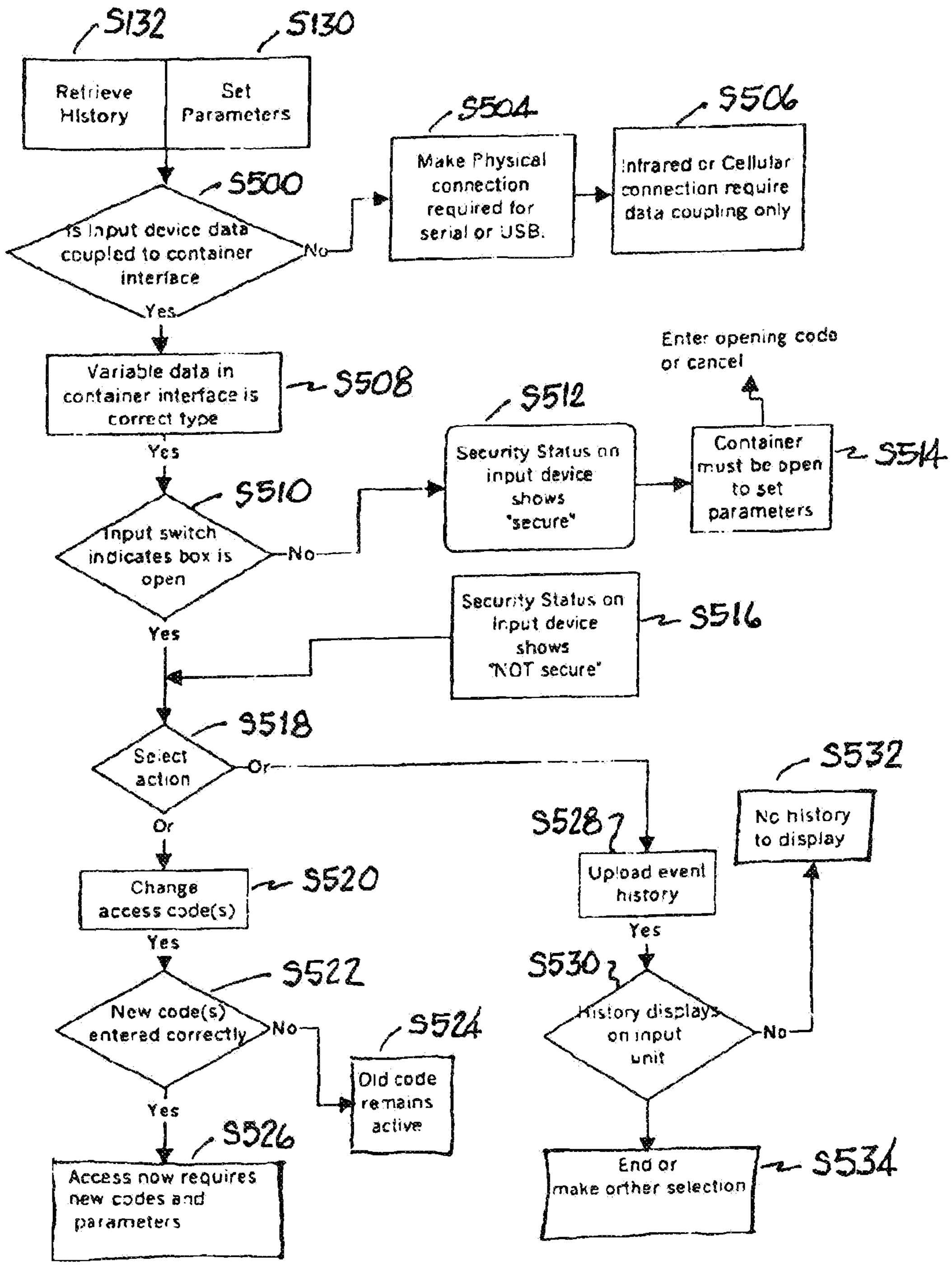
FIG. 14 is a flowchart that illustrates additional aspects of the operation of an embodiment of the present invention.

Turning now to the operation of the various embodiments and modifications of those embodiments disclosed in the foregoing paragraphs, FIG. 10 is a flowchart describing the beginning of a communication session between the display input device and data coupled container to the point of a major function selection; FIG. 11 is a flowchart describing the major function from FIG. 10 of closing the container to secure contents or prevent items being placed in the container; FIG. 12 is a flowchart that is the first of two charts describing the major function from FIG. 10 of opening a container to gain access to container contents or interior; FIG. 13 is a flowchart that is the second of two charts describing the major function from FIG. 10 of opening a container to gain access to container contents or interior; and FIG. 14 is a flowchart describing the major functions from FIG. 10 of retrieving event history and changing operational settings.

In the following description, the reader will find use of the terms, coupled and de-coupled as a description of data connection and disconnection, respectively, between a container or group of containers and one or more graphical user interface/input units of the same or varying types. This coupling may occur across the room, a length of wire, an air gap or across the globe in accordance with the network methods used to accomplish the data coupling. It may include live high speed data connection or may take the form of Internet mail or message packets, through which the container and the graphical user interface/input units exchange, data, settings, and exchange information.

Turning to FIG. 10, it may be seen that S 100 determines if an input/graphical user interface device is currently data coupled to the containers variable data interface stage. S 102 instructs connection for serial or USB connections while S 104 instructs for infrared or cellular interfaces. If the interface type is correct as in S 106, it must be determined in S 108 whether more than one container is connected to the display/input device at one time. If only one device is connected as in S 110 then the display will only indicate one coupled container along with its unique ID and its current security status. The indication of the unique ID displayed by the graphical user interface/input unit and the security status displayed are the result of communication between the micro-controller in the subject container and the micro-controller of the graphical user interface/input unit communication via the variable data interface section of the container circuitry and the communication interface of the graphical user interface/input unit. In the event that there are more than one container coupled as in Yes to S 108 then the graphical user interface (i.e.: cell phone, PC, PDA or other) will show each container and it s current status. At S 112, if the bolt position switch or series door position switch of a particular container indicates that the door is open then the status for that container is displayed as in S 116 as Not Secure. If at S 112, the status switch(es) indicate the container is secure as in S 114, then that indication will appear on the currently coupled graphical user interface/input unit. A 118 describes the users decision to change a container status if the user decision is no, en status on display will remain unchanged unless an event changes the status. In the event the user decides to change the status of a particular container he must select the container to change as in S 122 and then as in S 124 select a major function or action of either open container S 126, close container S 128, set parameters for the container S 130 or retrieve history of the container as in S 132. Once selection is made and confirmed S 134 then the appropriate figure and flowchart may be followed.

Turning now to FIG. 11, we see the flowchart which represents the selection S 128 close container. This action is for the purpose of securing contents stored in a container or preventing storage of items in a container by denying access to the contents. In the application where a container may be transportable and used in a courier application, it may be desirable to have the container locked open when not used and in the courier companies inventory. This may help prevent inadvertent placement contents in a box not currently slated for a particular customers use. S 200 determines if the container is in a code-to-lock mode. If it is as in S 206, then a code must be used to lock the container This action results in activation of the latching mechanism in such a way to allow the container to be made secure. One could allow any code, such as the current code, to be entered to secure the container or require a fresh unused code to be entered. In any case, the entered code S 206 becomes the next code required for opening of the container. S 208 determines if the container is in the GPS (global positioning system) mode. If the container is so equipped and in the GPS mode as in S 210, then the global coordinates for one or more destinations where the container may be opened must be entered through the coupled graphical user interface. If the container is ready to secure as in S 212, then it maybe closed by the user S 214 in the event the status shows that the container is not prepared to be secured S 212 then the next code must be entered correctly starting the sequence again at S 206 if S 200 indicated that the container is in a mode other than code-to lock, then it must be in normal mode S 204 and the sequence begins at the entry of S 208 to determine if GPS mode is active for the selected container. Once the container is secured as in S 214, then the status indication of the coupled graphical user such as may be provided by a cellular telephone, interface/input unit will indicate secure. If user desired activity is complete for this container then the coupled graphical user interface/input unit maybe de-coupled and if physical connection is part of the data coupling process, the physical connected maybe removed as described at S 216.

Observing now FIG. 12, starting at S126 the reader see that the major function of choice for the user is to open the container. S300 indicates by the way of information that one or more users at the same or different locations and one or more types of coupled graphical user interface/input units may be involved in this process. Determination of data coupling is described in S 304, while S 306 describes use of serial or USB connections, while S 308 describes infrared and RF or cellular connection. S 310 determines that the variable data interface of the container is of a type compatible with the coupled graphical user interface/input unit. By way of information S 312 indicates that the security status of the container shown on the coupled graphical user interface/input unit is secure. The indication of the unique ID displayed by the graphical user interface/input unit and the security status displayed are the result of communication between the micro-controller in the subject container and the micro-controller of the graphical user interface/input unit communicating via the variable data interface section of the container circuitry and the communication interface of the graphical user interface/input unit. S 314 determines if the container is in the normal mode. If the determination is yes then the user enters code as in S 400. In the event that the container is in GPS mode S 316 then it must be at the correct global coordinates to be opened S 322. In the event it is not at the correct coordinates S 324, the container must be re-located to the correct co-ordinates (location). If the container is in high security mode S 318, then one part of the required opening code must be received by the container from the origin site S 412 before the user enters the second code data sequence at S 400 at the destination site. In the event that the first part from the origin site S 412 has not been received then the origin first code data may be requested across the network from the appropriate coupled origin source. In the event that the subject container is in the dual security mode as in S 320, then two parts of a code must be entered into a coupled graphical user interface/input unit at S 420. This two part code may consist of live entry of a password as well as a data carrying card credential or presentation of biometric data via a biometric reader to authenticate the user and thus complete code entry described by S 422. If container is not in dual security mode at S 320, then normal code entry at S 400 permits the determination at S 402 at S 402 the micro controller reads its memory contents where the opening data is stored and compares that to the just entered codes described in the frames between S 314 and S 402. If code matches and authentication is deemed correct by the micro-controller, then the decision control point formed by the micro-controller, memory, clock and I/O will activate switch at S 404 which in turn switches power to cause a moving element to change state at S 408 thus allowing access to container interior and any contents therein. This moving element may for example be a latch, bolt or cover which is released by a motor, solenoid, bi-metal element, alloy element or other element capable of permitting access to the, interior of the container. If user desired activity is complete for this container then the coupled graphical user interface/input unit may be de-coupled and if physical connection is part of the data coupling process, the physical connected may be removed as described at S 406.

Observing now FIG. 12, starting at S 126 the reader will see that the major function of choice for the user is to retrieve history or set parameters. Determination if of data coupling is described in S 500, while S 504 describes use of serial or USB connections, while S506 describes infrared and RF or cellular connection. S S08 determines that the variable data interface of the container is of a type compatible with the coupled graphical user interface/input unit. By way of information S 512 indicates that the security status of the container shown on the coupled graphical user interface/input unit is secure. The determination of this condition is the present state of input switches reflecting position of the latching mechanism and the container cover as read by the micro-controller as shown in S 510. The indication of the unique ID displayed by the graphical user interface/input unit and the security status displayed are the result of communication between the micro-controller in the subject container and the micro-controller of the graphical user interface/input unit communicating via the variable data interface section of the container circuitry and the communication interface of the graphical user interface/input unit. A not secure condition may be indicated as shown in S 516. If the user chooses to upload the history events as in S 528 then this history will be communicated to the graphical user interface/input t for play. If no history exists S 532, none will be displayed and the session may be ended or another selection made as in S 532. Any of the choices S 126,S 128,S 130,S 132 or de-coupling as in S 216 may be chosen. If the user chooses to change the code as in S 520 and the new code is entered as in S 522 then the access codes required to open the container are new ones as in S 526. If incorrect parameters are met or incorrect code entry is made then the old code data remains active as S 524.

Figure 15:
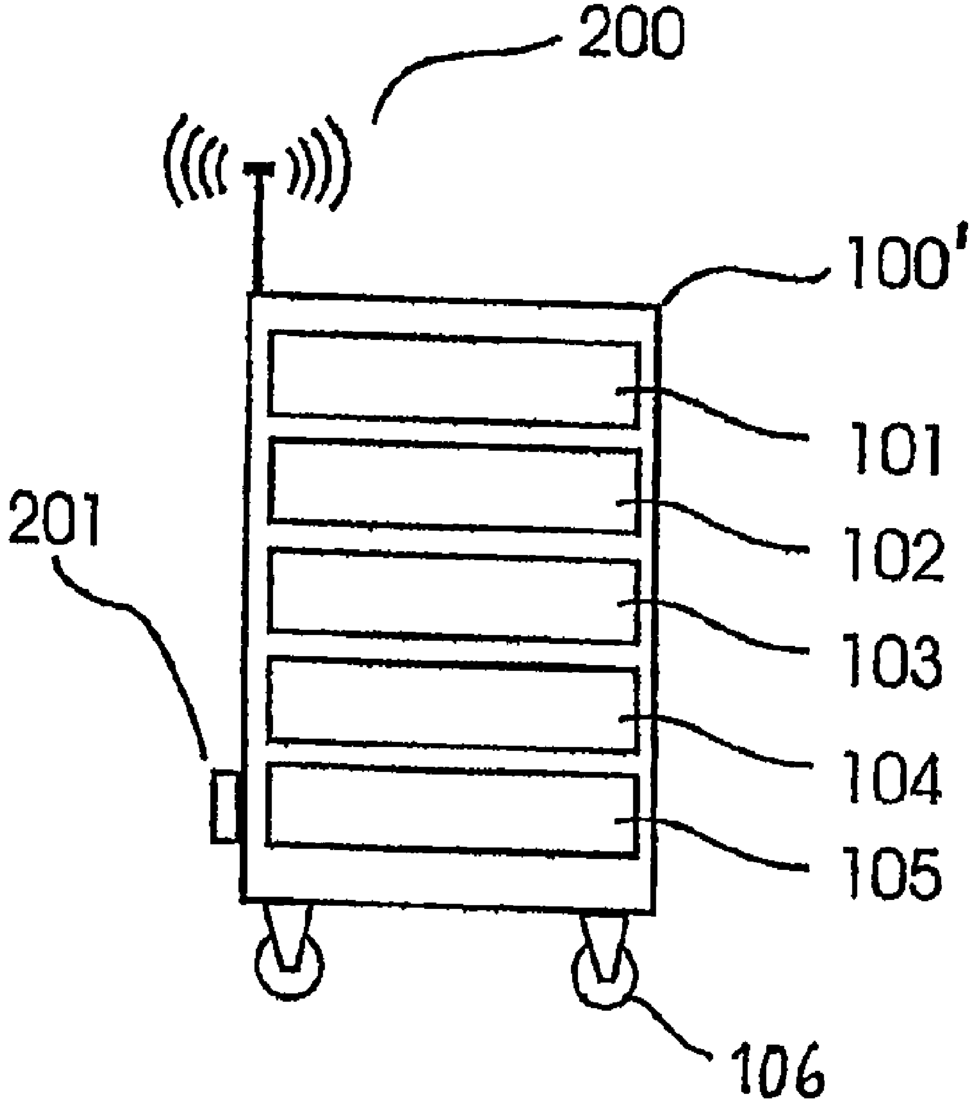
FIG. 15 illustrates another embodiment of a portable container in a closed state.

As FIG. 15 shows, an alternative embodiment of a portable container 100', which is designed as a piece of furniture on transport rolls 106. The piece of furniture can be carried on the transport rolls 106, for example in a hospital, office etc. In the present embodiment the piece of furniture is designed as a chest of drawers, having a multitude of drawers 101 to 105. The chest of drawers is provided with a port, details of which are described above, to be coupled with a host computer. The chest of drawers is also provided with an antenna 200 to receive and emit data from and to, respectively a remote control. The drawers 101 to 105 each constitute inner casements, as described above, which are secured in the portable container 101 as described above.

Figure 16A:
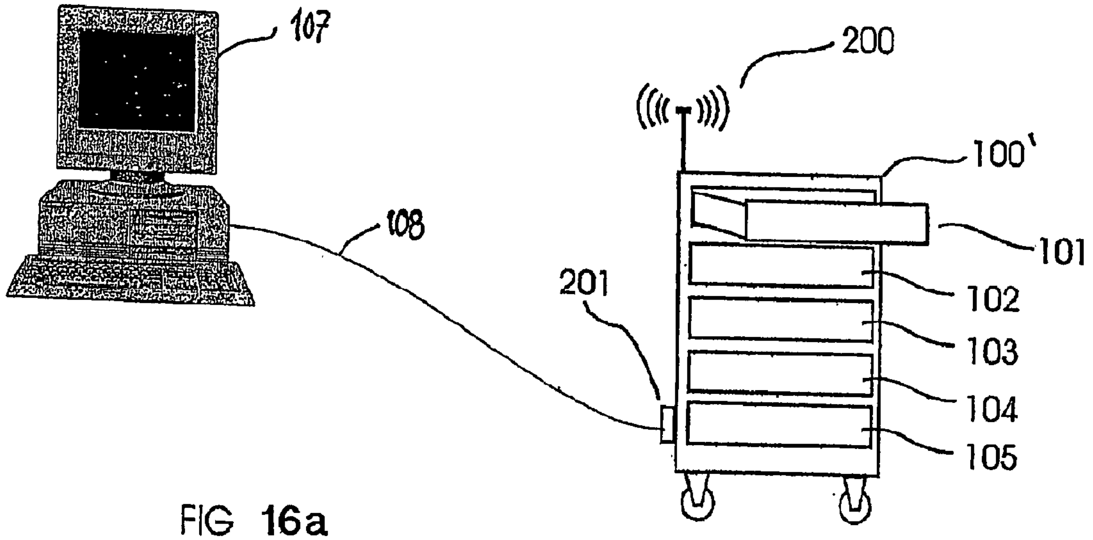
FIG. 16*a* illustrates the portable container of FIG. 15 connected to a host computer in a first accessible state.

FIG. 16*a* illustrates a situation, in which a local computer 107 is connected by a cable 108 with the socket 201 of container 100' to perform a data transfer as described above. To unlock one single drawer 101 to provide access to the interior of drawer 101.

Figure 16B:
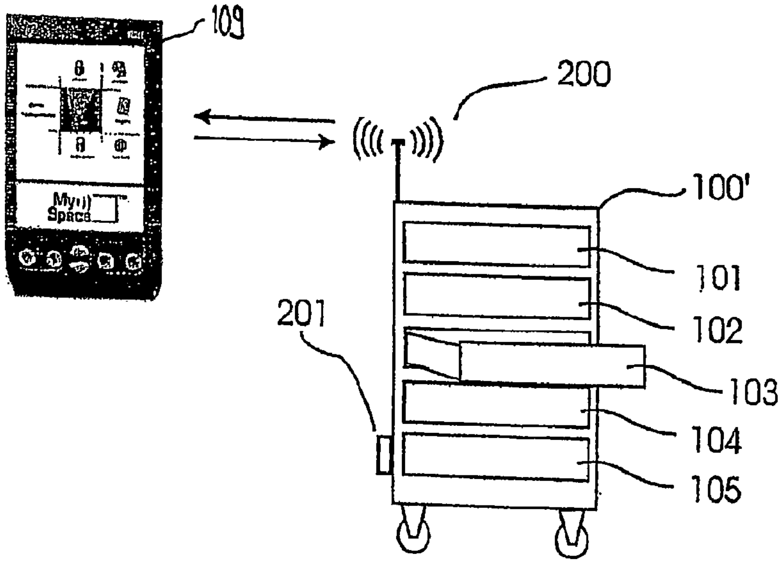
FIG. 16*b* illustrates the portable container of FIG. 15 in connection with a portable computer in a second accessible state.

FIG. 16*b* illustrates a situation, where a remote control 109 is operationally coupled via the antenna 200 with the portable container 100' to allow access to one of the drawers 103 according to procedures as described above.

Figure 17:
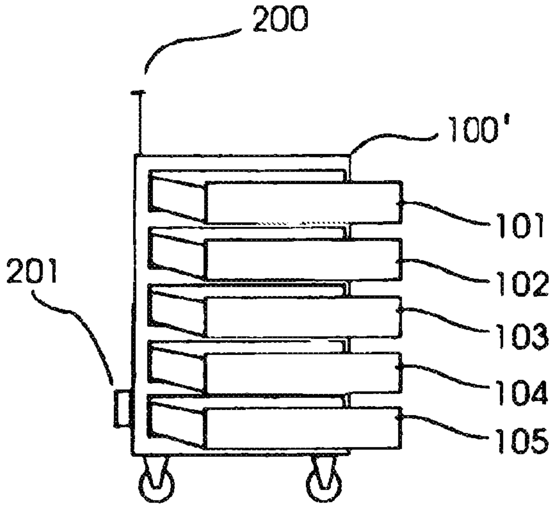
FIG. 17 illustrates the portable container of FIG. 15 in a third accessible state.

FIG. 17 illustrates the portable container 100' with all drawers open and accessible. In this open state the portable container 101 can be connected to a local computer.

Figure 18:
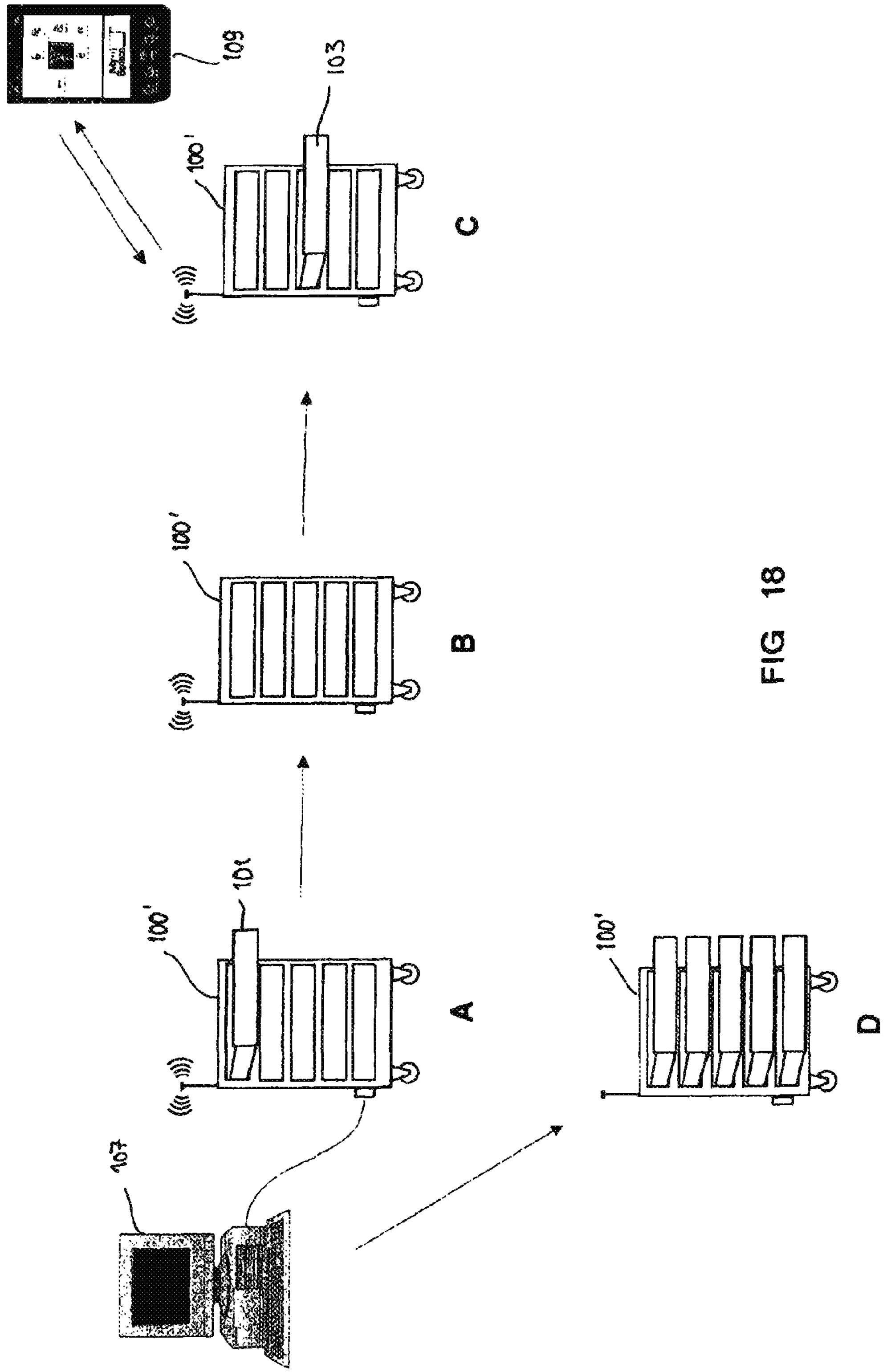
FIG. 18 illustrates the transport of the portable container of FIG. 16*a* to sites with a remote control according to FIG. 16*b* and FIG. 17, respectively.

FIG. 18 illustrates, how container 100' is connected to the local computer 110 in a first place A. Then it is transported (B) to another place C, where it is controlled by remote control 109 to provide access to one drawer 103. In another place D the container 101 is empty, unlocked, ready to be loaded with contents and to be plugged to a local computer so it may secured once again.

Figure 19:
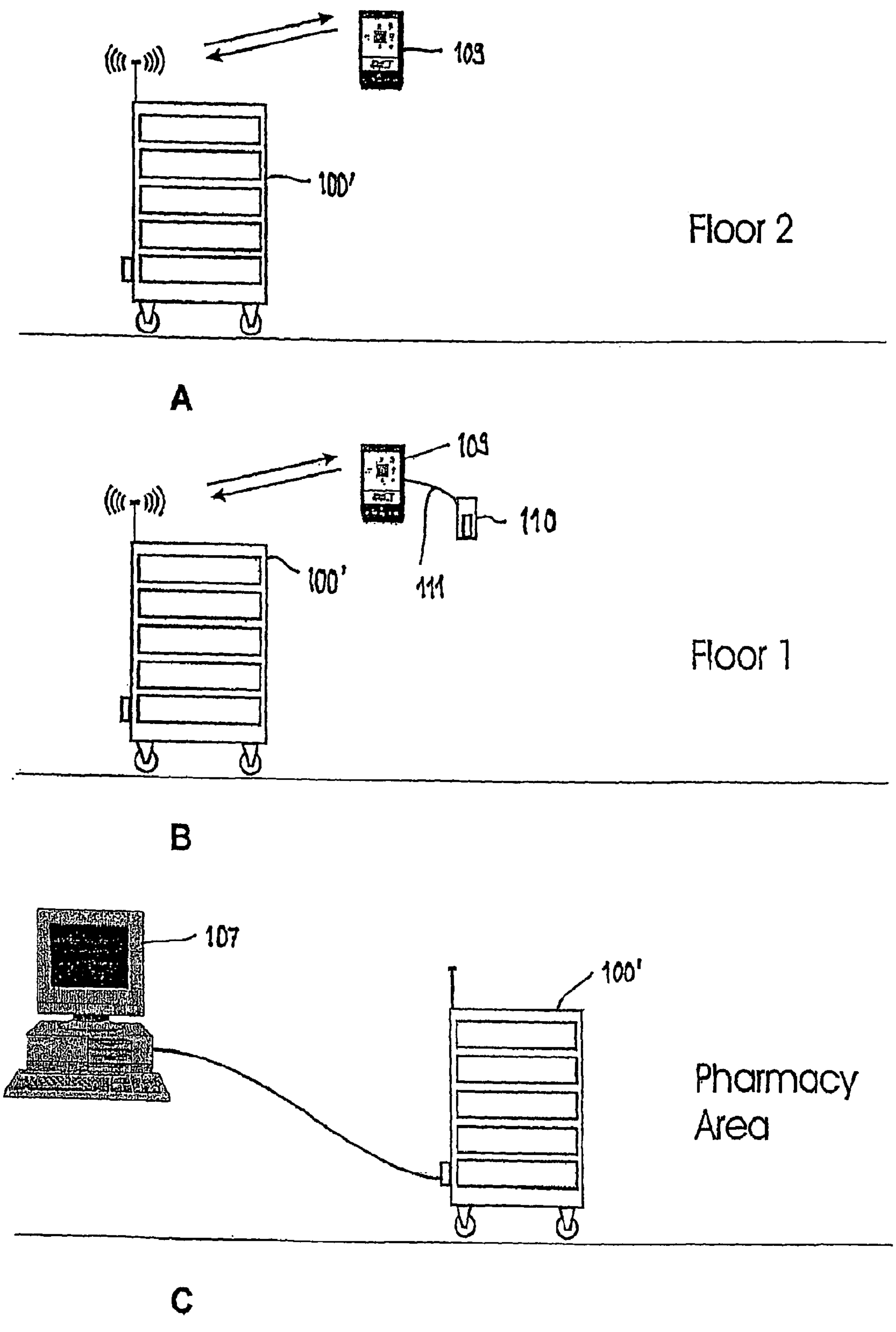
FIG. 19 illustrates an implementation of the portable container of FIGS. 15 to 18 in a hospital.

FIG. 19 illustrates the use of the portable container 100' in a hospital. In a pharmacy area there is provided a local computers 107 to communicate with the portable container 100'. In the pharmacy, it is stocked with medications for patients located elsewhere. At another location of the hospital, for example floor 1, the portable container 100' is in communication with remote control 109. The remote control 109 is coupled through a cable 111 with a local socket 110. Here medications may be dispensed based on proper authorization for access. This may also be coupled with a GPS or location device to ensure that the container may only be opened at the correct location of the proper patient or require biometric data from the correct patient via biometric reader 110. At a third location, for example floor 2, the local container 100' is in a wireless communication with remote control 109.

Figure 20A:
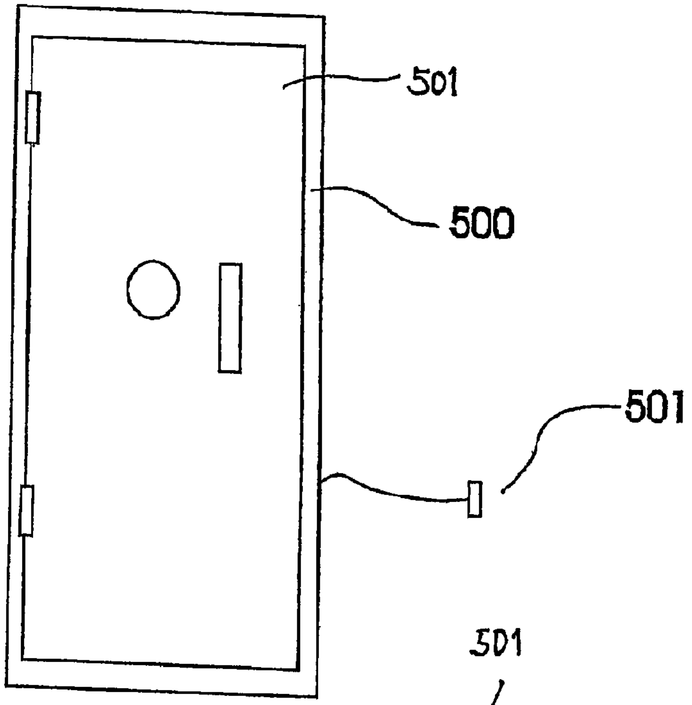
FIGS. 20*a* and 20*b* each illustrate the current state of the art of portable container cassettes in an ATM machine, further illustrating the outside container in a closed and open state, respectively.
Figure 20B:
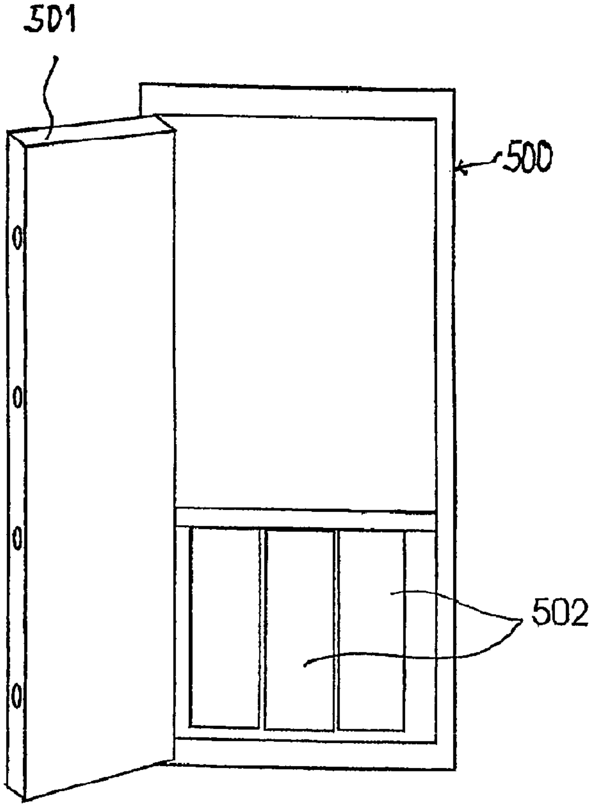
Figure 21A:
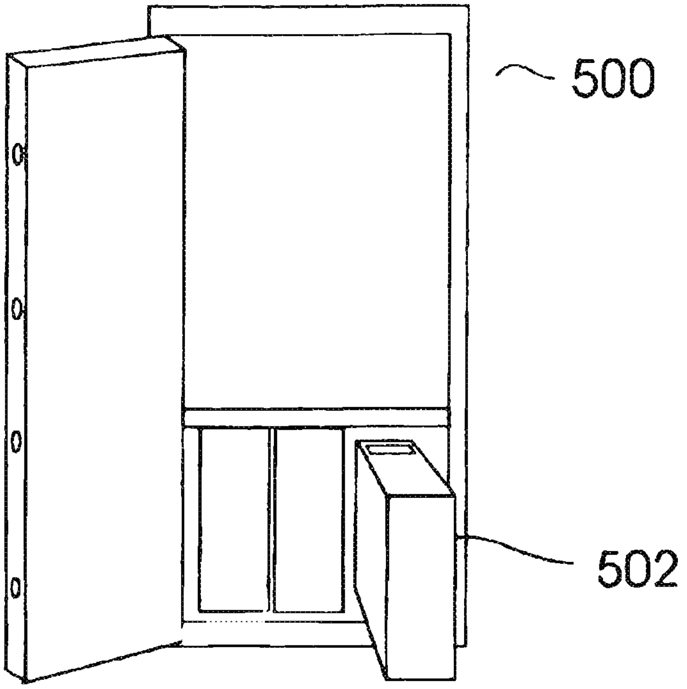
FIG. 21*a* illustrates the open state of the ATM of FIG. 20*b* during the removal of a portable cassette container from its use position.
Figure 21B:
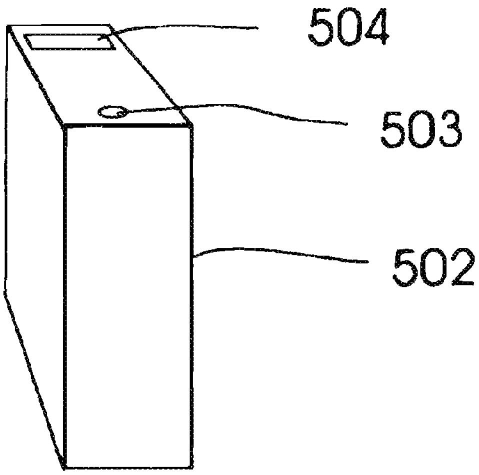
FIG. 21*b* illustrates the portable container of FIG. 21*a;*
Figure 22B:
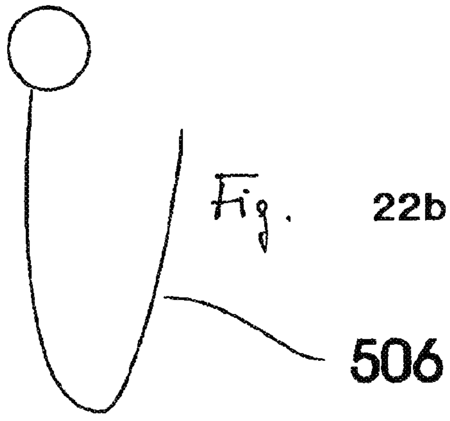
FIG. 22*b* illustrates an alternative lead seal used to secure the containers of FIGS. 20 to 21.
Figure 22A:
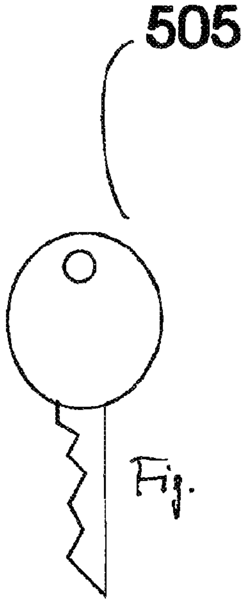
FIG. 22*a* illustrates a mechanical key for the containers of FIGS. 20 to 21.

FIG. 21*a* illustrates the open state of the ATM of FIG. 20*b* during the a removal of a portable cassette container 502 from its use position. In present practice, the door may be opened with no data cooperation from any network;

FIG. 21*b* illustrates the portable container 502 in present practice may be removed freely from 500 and opened by mechanical lock 503 and shows the cash dispensing slot 504;

FIG. 22*a* illustrates a mechanical key for the containers of FIGS. 20 to 21;

FIG. 22*b* illustrates an alternative lead seal used to secure for the containers of FIGS. 20 to 21;

FIG. 20*a* shows a front view of a door 502 of an ATM machine 500 in its closed state. The ATM machine 500 constitutes a secured stationary room to receive a multitude of portable cassette containers 502, as can be seen from FIG. 20*b* with the door 501 open. The door of 501 is secured to the strong room 500 as described above in connection with the outer container 70 of FIG. 2. The ATM machine 500 is provided with a socket 501 to be coupled with a local computer or remote network computer as described above. Data signals sent from an origin to the destination, namely ATM 500s location, combined with data applied at the destination (location of ATM 500) can result in the dislodging or opening of door 501.

Also, as shown in FIGS. 21*a* and 21*b*, each of the multitude of containers 502 is designed as the portable containers as described above. The release of the portable containers 502 from the strong room 500 is accomplished in accordance with the procedures as described above. To this aim each container 502 is provided with a socket 501.

Figure 23:
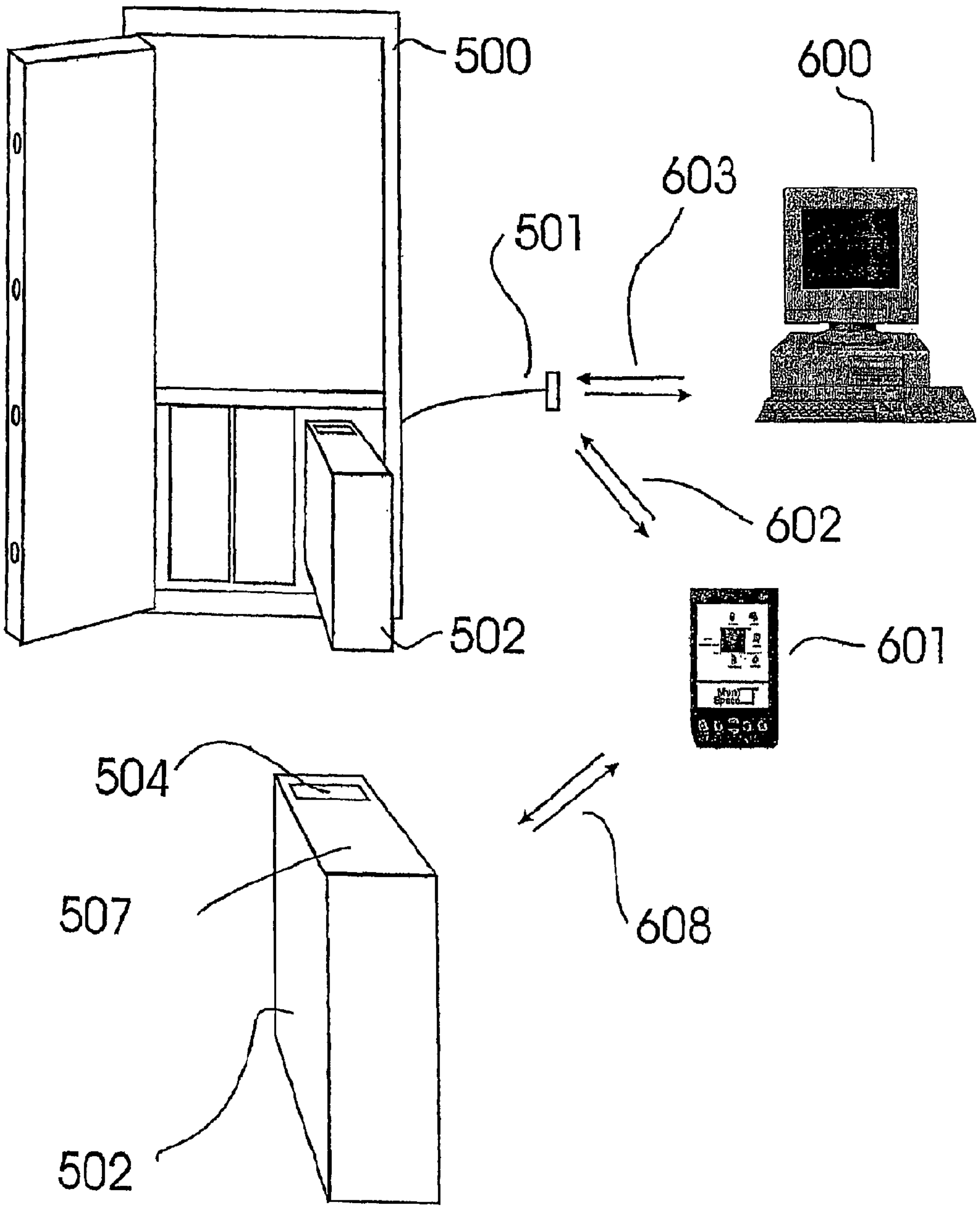
FIG. 23 illustrates the transport of a portable container of FIGS. 20 to 21, removal of the container from it's anchoring point and data connections by a host computer and by a handheld GUI device.
Figure 24A:
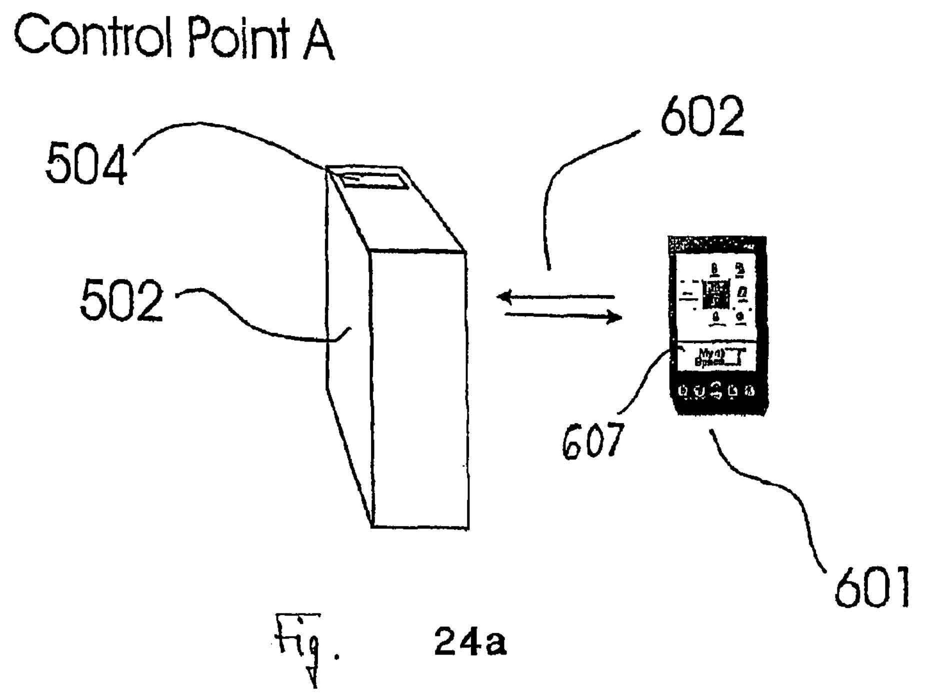
FIGS. 24*a* and 24*b* each illustrate communication with the portable container of FIG. 23 at a control point in a docking bay at the office and by handheld GUI device in field.
Figure 24B:
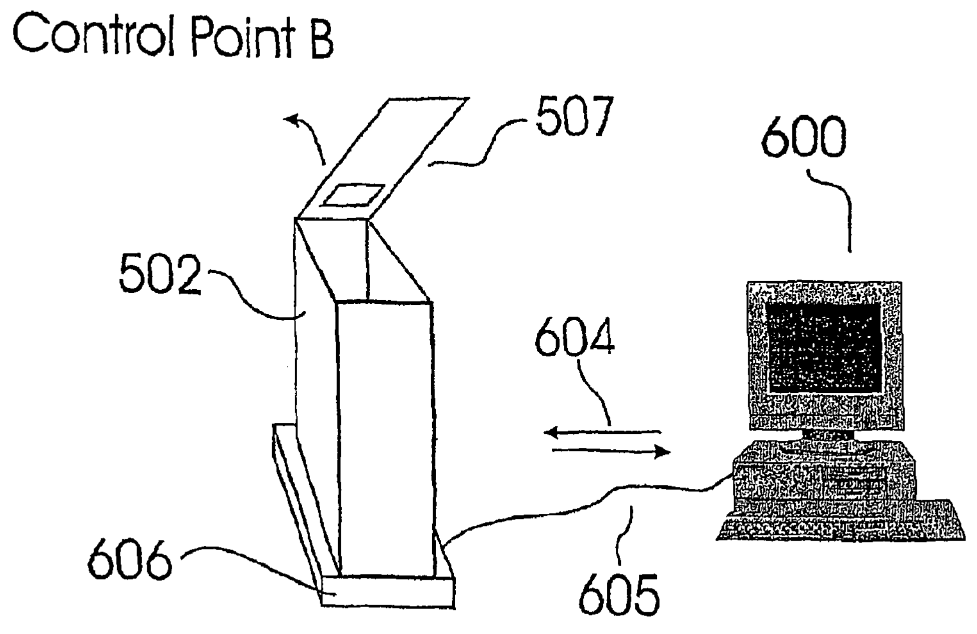

FIG. 22*a* illustrates a mechanical key for the containers of FIGS. 20 to 21 in todays practice;

FIG. 22*b* illustrates an alternative lead seal used to secure the containers of FIGS. 20 to 21 in today's practice;

FIGS. 23 and 24 further illustrate the transport of a portable container 502 from the ATM machine 500 from a first control point A where it may be opened or locked or released from its mooring by computer 600 or computer 601 to a second control point B where it may be moored, data coupled and opened. At the outset, a local computer 600 or portable computer 601 is coupled to socket 501 or directly data: coupled to the control system of cassette container 502 of strong room 500 to release the container 502 from the strong room 500.

Conversely the cassette 502 may be locked and prepared at control point B for return to control point A and reinstalled in ATM Machine 500. It may be moored or attached to ATM machine 500 by electro-mechanical means as a result of signals from computer 600 or portable computer 601.

Each of FIGS. 20*a*, 20*b*, and 23 represent the invention wherein ATM machine 500 is a controlled container and within it resides other controlled containers in the form of cassette containers 502;

The diagram of FIG. 26 illustrates the various features and operations of the invention.

The following is a summary of further features and advantages of the invention.

Conventional locks controlling containers consist of three units, entry unit, processing unit and movable element. This applies either for mechanical and electronic locks.

The invention of the container controlling system is to put the whole specific lock intelligence inside the moving element unit or inside an adapter unit which can be used for different entry units. That means the entry unit of the invention includes no container specific intelligence at all so that any electronic device which allows to enter a code in any way, also like a biometric code, and which allows to communicate secure with a different electronic device can be used as an entry unit of the invention like a cell phone, a palm or any kinds of PCs.

The secure communication can be either over wire or wireless eg. over radio technologies. Regarding the encryption of the communication, it can be a standard encryption or a proprietary one.

Using the adapter version you can also use different kinds of moving elements, which can be connected to the adapter which in turn is responsible for the communication with any kinds of entry devices mentioned above.

In addition, the container may utilize as a control stage a single "PC on a chip" integrated circuit which may use a PC operating system including a web server. This capability allows nearly any standard, PDA, PC or web enabled cell phone to act as a data entry device, in some cases only using a web browser to access the web page and graphical interface provided from within the container control stage.

The big advantage of the invention is that you need not provide a proprietary data entry unit installed on each container. You may use industry standard devices and do not have to allocate space on the container nor cost in its design to a dedicated mounted data entry unit.

Further must be mentioned the huge flexibility of the new product. In compare to the mechanical locks you have the advantages to use all the advantages of an electronic lock like code splitting, audit trail, easy configuration of functions, like time delay, four eye principle and so on. You do not need a physical key which can be lost, or forgotten. In large populations of containers key administration and related costs are a very tangible problem. For example in case an ATM cassette, the cash carrier personnel needs a bundle of keys for opening a variety of different cassettes. The normal mechanical lock system offers no information about the last opening of the cassettes. In view of the expansion of the ATM locations eg. in hotels, retail stores the negative effect of the many physical keys of cassettes will increase.

The invention allows to retrofit the ATM cassettes with this, container control system because compared to retrofitting with conventional electronic locks you don't need a space for the code or data entry unit on the exterior surfaces of the cassettes.

So compared to the conventional electronic locks the invention has the advantage that there is no visible part outside the container. In the case of a wired communication solution, the only thing visible is the socket. In case of using a wireless solution you just have to make sure that the data connection exists. So it can be possible to find a suitable place for the antenna inside the box. This feature helps conceal a logical point of forced attack as would be obvious in conventional mechanical and electronic lock solutions.

The use of different entry units and communication channels provide for more flexibility. For example using a movable container (box, cassette, etc.) at the destination nobody can open the box without release from the origin This can be accomplished via wire or wireless communication with a entry unit mentioned above.

It could also be possible that the sender has no code. He has just to close the box at the origin. If the box must be unlocked it can be done by the recipient over wire or wireless connection using a standard data entry unit he already owns.

One scenario could be that the sender and receiving person has the code or part of the code, or an authorized party in a remote location may prepare the code for use by the container receiving party at the destination.

Another method of location is that the box is data connected to a network and if proper destination can be determined by a proper email address, or proper IP address of the coupled computer, then the party who receives the box will have all or part of the code to open it.

Also location system like GPS can be integrated by using one of the input channels. This has the advantages that the lock can be configured to unlock only in certain defined (programmed) locations. You can have GPS supervision or monitoring of the proper locations, and a list of determined locations programmed in the container control stage.

Additionally, you can use it as a tracking unit for giving an alarm if the box leaves the determined path back and forth from origin to destination.

The possibility to use entry units like PC cell phone, teleguidance and so on requires on the lock side a processing unit which includes memory, CPU, clock and software. So you can implement different scenarios. In one case the software or part of the lock application software has to be implemented inside the entry unit.

In another and more convenient case the software is running inside the lock or adapter system and inside the entry unit, only a standard viewing tool such as browser, like Internet Explorer™ is necessary. In this case a WEB Server running in the controller (100) or variable data interface (300).

An other important issue of the invention is the expansion capability in case of implementing the container control system inside a box system like a safe deposit box system with a couple of boxes. Here you can connect the locks over different channel depending on the price and monitoring functions required. So in one case all locks can have there own monitoring processing unit, e.g. over TCP/IP.

In a second case the locks consist a lower communication channel like I2C which are connected to an adapter including the high communication channel like TCP/IP.

All these features are examples of the resulting benefit that the control stage or the adapter includes the container specific information and the entry unit is just a standard communication unit without specific lock commands or proprietary design.

What is claimed is:

1. A container managing system comprising at least:

a portable container and a host computer, wherein the portable container comprises:

a housing comprised of a plurality of sidewalls bearing a removable lid, forming said portable container having a closed interior while said lid is in complete engagement with said housing, and providing an open interior able to removably receive items within said open interior while said lid is dislodged from said complete engagement;

a port borne by said housing to accommodate conduction of transmission of data signals between said closed interior and an environment external to said housing;

a control stage comprised of a memory storing information specific to said container said control stage being mounted entirely within and being completely encased by said container during said complete engagement, and being operationally coupled to provide communication with said interior via said port, and generating a control signal in dependence upon disposition of said port relative to the host computer as a source of said data signals, in dependence upon disposition of said container at a geographical location within an authorized range of siting of the container, and in response to occurrence of a coincidence between a data key received among said data signals via said port and a data sequence obtained by said control stage in dependence upon said information stored within said memory;

a moveable latch disposed to engage said lid and hinder removal of said lid from said complete engagement, and to respond to said control signal by releasing said lid from said complete engagement; and wherein the host computer is sited externally to the portable container and can be coupled to the port of the portable container via a cable, infrared or RF to transmit and receive data signals to/from the control stage inside portable container, wherein the host computer includes an input device for inputting a request for access and personalized information of a user, wherein the host computer is adapted to verify the personalized information and to send the data signals including a data key to the control stage, wherein the host computer includes a display unit for displaying security status information received from the control stage via said port, wherein the control stage is configured to generate an alarm signal in response to an unauthorized interruption of said communication via said port, wherein a first alarm is driven by said control stage to broadcast an indication of said unauthorized interruption in response to said alarm signal; and the microprocessor based host computer is operationally coupled to said control stage via said port to periodically make a determination of whether said an unauthorized interruption of said communication has occurred; and a second alarm is driven by said host computer to broadcast an indication of said unauthorized interruption upon said determination.

2. The container managing system of claim 1, further comprising a socket mounted within said housing providing said port.

3. The container managing system of claim 1, further comprising an infrared receiver mounted within said housing providing said port.

4. The container managing system of claim 1, further comprising an antenna mounted within said housing providing said port.

5. The container managing system of claim 1, wherein the host computer is operationally coupled to said control stage via said port and is generating said data key, wherein said host computer is coupled to said port via a cable or a local area network.

6. The container managing system of claim 1, comprising:

a first antenna of the port mounted on one of the sidewalls of the container;

a data transceiver connecting said first antenna and said control stage; and a second antenna driven by said host computer, operationally connecting said host computer to said first antenna.

7. The container managing system of claim 1, further comprising:

an infrared transmitter driving by said host computer to broadcast an infrared signal corresponding to said data key; and an infrared receiver disposed to receive said data key from said infrared transmitter.

8. The container managing system of claim 1, further comprising:

a first infrared transmitter and receiver driven by said host computer to broadcast an infrared signal corresponding to said data key; and a second infrared transmitter and receiver mounted on one of said sidewalls, disposed to receive said data key from said infrared transmitter, and to transmit operational communications from said control stage to said host computer via said first infrared transmitter and receiver.

9. The container managing system according to claim 1, wherein said control stage is generating an alarm signal in response to an unauthorized interruption of said communication via said port, wherein an alarm is driven by said control stage to broadcast an indication of said unauthorized interruption in response to said alarm signal.

10. The container managing system according to claim 1, wherein the control stage is periodically making a determination of whether said an unauthorized interruption of said communication has occurred; and an alarm driven by said host computer to broadcast and indication of said unauthorized interruption dependence upon said determination.

11. The container managing system of claim 1, wherein the microprocessor based host computer is sited externally to said container, said host computer comprises a keyboard initiating formation of said data signals and a monitor driven by said host computer to visually display video images, said host computer being operationally coupled to said port and participating in said communication by generating said data signals.

12. The container managing system of claim 1, wherein the container comprises:

a motion sensor providing a first class of information, mounted upon and borne by said housing and indicating a movement of the housing;

the memory storing a second class of information specific to said container.

13. The container managing system of claim 1, wherein the container comprises:

a location detector providing a first class of information indicating a position of the container.

14. The container managing system of claim 1, wherein said control stage is generating said control signal in dependence of said disposition of said port, in dependence of said information represented by said data signal, in dependence of said occurrence of coincidence, and in response to instructions received by said control stage from the host computer (100) coupled to said port.

15. The container managing system of claim 1, wherein said container being transportable between an origin and a destination, and said data key being encoded and being available only at destination.

16. The container managing system of claim 1, wherein said container being transportable between an origin and a destination, and said data key being encoded and being transmitted to said port from said origin.

17. The container managing system of claim 1, further comprising a cellular telephone bearing a graphical user interface, wherein the cellular telephone is coupled to the host computer.

18. The container managing system of claim 1, wherein some or all of said data signals being transmitted across or received one of an Internet and a wide area network.

19. The container managing system of claim 1, wherein said data signals comprising one of an email packet and an attachment to an e-mail message.

20. The container managing system of claim 13, wherein said information represented by said location detector comprising a global location of the container.

21. The container managing system of claim 1, wherein said container being transportable between an origin and a destination, and a user at one of said origin and said destination requests via a network a request for some part of said data key.

22. The container managing system of 12, wherein said container being transportable between an origin and a destination, and said second class of information is installed at said origin comprises biometric data matching a person of a human user of said container and said coincidence must be made with biometric data matching said person at said destination.

23. The container managing system according to claim 1, wherein said control stage (120) comprises a portable computer and said portable computer provides a data to the host computer when said host computer is equipped with a web browser.

24. The container managing system according to claim 1, wherein a plurality of portable containers is releasably stored in a secured stationary room, the room having a door and a door lock.

25. The container managing system according to claim 20, wherein the door lock is operationally coupled to a port to provide communication with the host computer and/or a remote control.

26. The container managing system of claim 24, wherein portable containers may be electromechanically released.

27. The container managing system of claim 12, wherein a portion of said second class of information comprises data describing the personal characteristics of a person permitted to access the interior of said container.

28. The container managing system according to claim 24, wherein said housing and said lid may be a housing and drawer.

29. The container managing system according to claim 1, wherein the container may only be opened in certain defined locations.

30. The container managing system according to claim 1, wherein an interruption of communications between the host computer and the container is used to trigger an alarm.

31. The container managing system according to claim 1, wherein the container further comprises a location sensor furnishing an indication of the geological location of the container, wherein access to the container is denied whenever the container is not located on an assigned location.

32. The container managing system according to claim 1, wherein the container further comprises a motion sensor for detecting movement of the container.

33. The container managing system according to claim 1, wherein power for operation of the portable container is supplied from the host computer.

34. A portable container connectable to a host computer, wherein the portable container comprises:

a housing comprised of a plurality of sidewalls bearing a removable lid, forming said portable container having a closed interior while said lid is in complete engagement with said housing, and providing an open interior able to removably receive items within said open interior while said lid is dislodged from said complete engagement;

a port borne by said housing to accommodate conduction of transmission of data signals between said closed interior and the host computer coupled to the port;

a control stage comprised of a memory storing information specific to said container, said control stage being mounted entirely within and being completely encased by said container during said complete engagement, and being operationally coupled to provide communication with said interior via said port, and generating a control signal;

in dependence upon disposition of said port relative to the host computer as source of said data signals, in dependence upon disposition of said container at a geographical location within an authorized range of siting of the container, and in response to occurrence of a coincidence between a data key received among said data signals via said port and a data sequence obtained by said control stage dependence upon said information stored within said memory;

a movable latch disposed to engage said lid and hinder removal of said lid from said complete engagement, and to respond to said control signal by releasing said lid from said complete engagement;

one or more sidewalls forming an outer casement closed at one end by a continuous bottom surface, wherein an inner casement having one or more sidewalls jointed together and closed at one end by a continuous bottom surface, an upper rim of the inner casement is extended outward to engage the inner surfaces and sidewalls to provide a cavity between the spaced apart sidewalls of the inner casement and inner surfaces of the outer casement, wherein a circuit board is placed in the cavity, wherein the circuit board providing the control stage is connected by a cable to a socket representing the port of the container, wherein an aperture is formed on one of the sidewalls of the outer casement to expose the socket to an environment external to a container, wherein the lid or other panel encloses both the inner and outer casements, wherein the port is configured to be coupled to the host computer sited externally to the portable container via a cable, infrared or RF to receive data signals including the data key from the host computer to provide the data signals to the control stage inside portable container, and the port is adapted to transmit security status information received from the control stage to the host computer having a display unit for displaying the security status information of the portable container.

* * * * *